(12) United States Patent
Manyam et al.

(10) Patent No.: US 12,417,430 B1
(45) Date of Patent: Sep. 16, 2025

(54) VERBALLY INTERACTIVE MATERIALS HANDLING FACILITY

(71) Applicant: AMAZON TECHNOLOGIES, INC., Reno, NV (US)

(72) Inventors: Ohil Krishnamurthy Manyam, Bellevue, WA (US); Rohit Prasad, Acton, MA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 94 days.

(21) Appl. No.: 14/307,053

(22) Filed: Jun. 17, 2014

(51) Int. Cl.
*G06Q 30/00* (2023.01)
*G06Q 10/087* (2023.01)
*G10L 25/48* (2013.01)
*G10L 15/065* (2013.01)

(52) U.S. Cl.
CPC ............ *G06Q 10/087* (2013.01); *G10L 25/48* (2013.01); *G06Q 30/00* (2013.01); *G10L 15/065* (2013.01)

(58) Field of Classification Search
CPC .................................................. G10L 15/065
USPC ........................................................ 704/270
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 9,785,952 B2 * | 10/2017 | Zinn ................... | G06Q 30/0256 |
| 2002/0107758 A1 * | 8/2002 | Takakura ............... | G06Q 30/02 705/26.7 |
| 2003/0113002 A1 * | 6/2003 | Philomin .............. | G06F 18/256 382/116 |
| 2004/0181461 A1 * | 9/2004 | Raiyani .............. | G06Q 30/0641 705/26.61 |
| 2005/0187758 A1 * | 8/2005 | Khasin .................. | G10L 15/005 704/10 |
| 2008/0294438 A1 * | 11/2008 | Geisel ................ | G01G 19/4144 704/251 |
| 2011/0011936 A1 | 1/2011 | Morandi et al. | |
| 2012/0284132 A1 | 11/2012 | Kim et al. | |
| 2013/0031476 A1 * | 1/2013 | Coin ................... | G06F 17/2881 715/706 |
| 2013/0284806 A1 | 10/2013 | Margalit | |
| 2014/0201025 A1 * | 7/2014 | Adoni ................ | G06Q 30/0631 705/26.7 |

(Continued)

OTHER PUBLICATIONS

Asthana, et al., "An indoor wireless system for personalized shopping assistance," Proceedings, IEEE Workshop on Mobile Computing Systems and Applications, 1994.*

(Continued)

*Primary Examiner* — Forrest F Tzeng
(74) *Attorney, Agent, or Firm* — Lindauer Law, PLLC

(57) ABSTRACT

Described are systems and techniques configured to acquire data from user speech generated by one user of a materials handling facility speaking to themselves or another user. The user speech is processed using natural language processing to determine key words, concepts, meanings, and so forth. Based on the processed data, queries may be executed, data may be presented in user interfaces, operation of the materials handling facility may be modified, and so forth.

21 Claims, 11 Drawing Sheets

(56) References Cited

U.S. PATENT DOCUMENTS

| | | | | |
|---|---|---|---|---|
| 2014/0257803 | A1* | 9/2014 | Yu | G10L 15/07 |
| | | | | 704/232 |
| 2014/0336537 | A1* | 11/2014 | Patel | A61B 5/0816 |
| | | | | 600/586 |
| 2014/0365334 | A1* | 12/2014 | Hurewitz | G06Q 30/0613 |
| | | | | 705/26.41 |
| 2015/0086107 | A1 | 3/2015 | Dedeoglu et al. | |
| 2015/0235637 | A1* | 8/2015 | Casado | G10L 15/222 |
| | | | | 704/235 |
| 2015/0269642 | A1* | 9/2015 | Cai | G06Q 30/0613 |
| | | | | 705/14.49 |
| 2016/0259339 | A1* | 9/2016 | High | A47L 11/4011 |
| 2016/0292966 | A1* | 10/2016 | Denham | G06Q 30/0633 |

OTHER PUBLICATIONS

Asthana, et al., "An indoor wireless system for personalized shopping assistance," Proceedings, IEEE Workshop on Mobile Computing Systems and Applications, 1994 (see previous Office action). (Year: 1994).*

Asthana, et al., "An indoor wireless system for personalized shopping assistance," Proceedings, IEEE Workshop on Mobile Computing Systems and Applications, 1994—see previous Office action attachment. (Year: 1994).*

Asthana, et al., "An indoor wireless system for personalized shopping assistance," Proceedings, IEEE Workshop on Mobile Computing Systems and Applications, 1994 - see previous Office action attachment. - see attached reference in the previous Office action. (Year: 1994) (Year: 1994).*

Asthana, et al., "An indoor wireless system for personalized shopping assistance," Proceedings, IEEE Workshop on Mobile Computing Systems and Applications, 1994—(see attached reference in the previous Office action). (Year: 1994).*

Asthana, et al., "An indoor wireless system for personalized shopping assistance," Proceedings, IEEE Workshop on Mobile Computing Systems and Applications, 1994. (Year: 1994).*

Asthana, et al., "An indoor wireless system for personalized shopping assistance," Proceedings, IEEE Workshop on Mobile Computing Systems and Applications, 1994 (see attached reference in the previous Office actions). (Year: 1994).*

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

* cited by examiner

VERBALLY INTERACTIVE MATERIALS HANDLING FACILITY

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to provide to users information associated with the items in inventory, other users, or other information about operation of the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
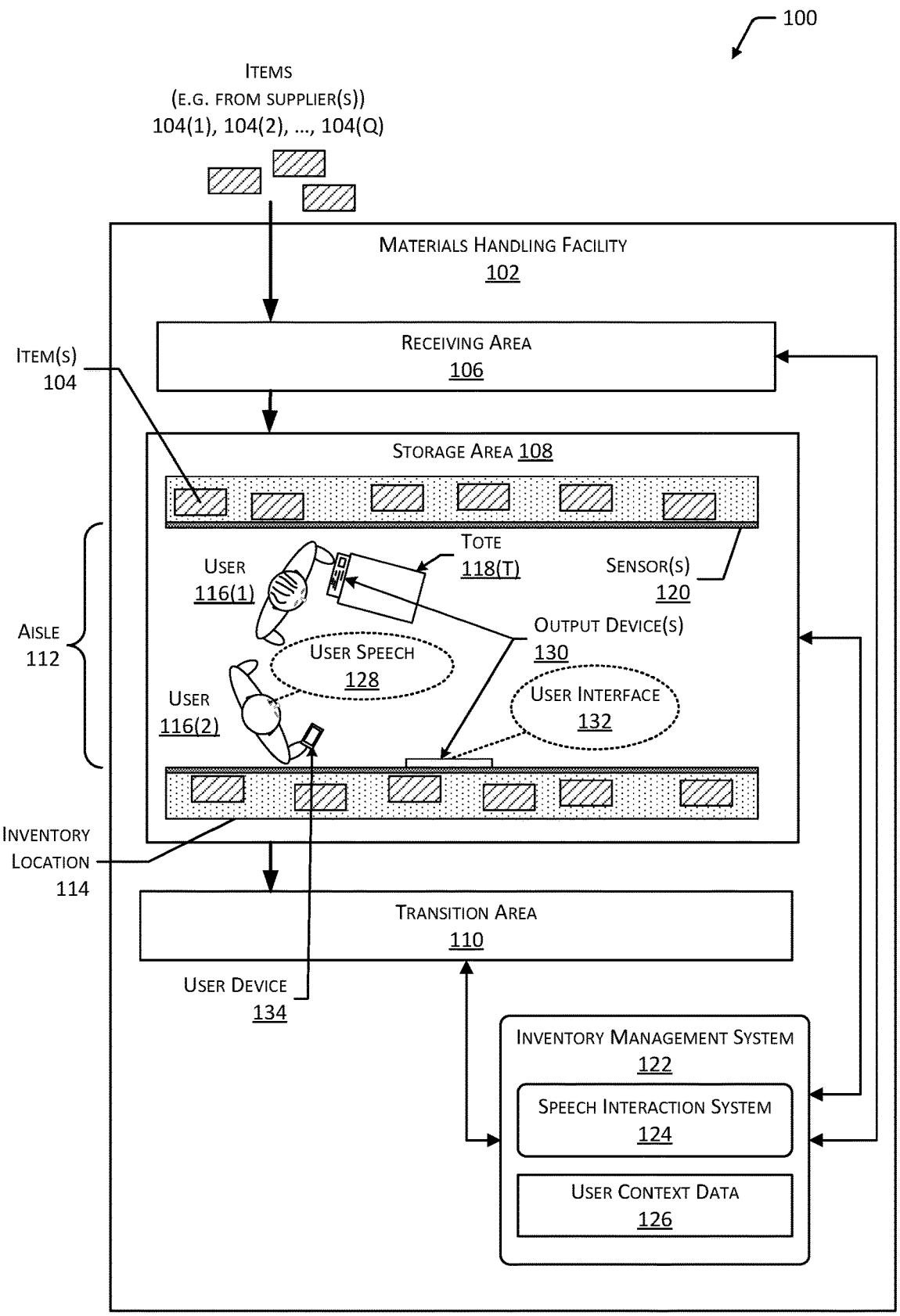
FIG. 1 is a block diagram illustrating a materials handling facility configured to respond to verbal communication between a user of the facility and another person, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for providing information to a user of a materials handling facility (facility). The facility may include, or have access to, an inventory management system. The inventory management system may be configured to maintain information about items, users, condition of the facility, and so forth. For example, the inventory management system may maintain data indicative of what items a particular user is ordered to pick, historical data about items the particular user has picked, suggested routes within the facility to follow while picking, and so forth.

The systems and techniques described in this disclosure may be used to provide a user of the facility with information, modify operation of the facility or mechanisms therein, or otherwise assist the user. A plurality of imaging sensors configured to acquire image data, such as cameras, may also be arranged within the facility. The image data may be processed by the inventory management system to determine information such as identity of a user, location of the user, and so forth.

A plurality of microphones may be arranged within the facility and configured to acquire audio data representative of sound within the facility. The microphones may be fixed within the facility, mounted on totes, carried by the user, and so forth. In some implementations, a plurality of microphones may be configured in an array. Data acquired by the array may be processed using techniques such as beamforming to allow for localization of a sound. Localization of a sound includes determining a position in space from which the sound emanates. The data acquired by the microphones may be processed by a speech interaction system of the inventory management system.

The speech interaction system may be configured to process the audio data and determine a communicative sound issued from the user. The communicative sounds may include, but are not limited to, speech, non-lexical utterances such as laughs, sighs, snorts, fingersnaps, handclaps, and so forth. For ease of discussion and not necessarily by way of limitation, speech as used in this disclosure may include the communicative sounds described above. The speech interaction system may be configured to recognize speech to generate text or commands, voice recognition to identify a particular user based on the communicative sounds, and so forth. In some implementations the speech interaction system may use the image data or data from other sensors to localize a source of sound. For example, the speech interaction system may compare facial movements with sounds to determine a particular user is speaking.

The speech interaction system is configured to process speech which is not directed to the speech interaction system. For example, the speech interaction system may process speech while a user is talking to themselves, speech when the user is talking to another person, speech when the user is talking to another system, and so forth. The other person or system to whom the user speaking may be physically present in the facility, may be in communication with the user by way of a cell phone or other audible communication mechanism, and so forth. For example, the user may be speaking to a personal information assistant application which executes at least in part on servers outside of the facility. The speech which is processed by the speech interaction system may not necessarily have a predefined syntax or grammar, instead comprising natural language. The speech interaction system may analyze attributes such as intonation, speaking rate, perplexity, and so forth to determine when speech is or is not directed to the speech interaction system. For example, based on an intonation which indicates a particular pattern of pitch, a speaking rate above 150 words per minute, and perplexity above a threshold value, the speech may be deemed to be directed at another user.

The speech interaction system determines one or more actions to perform based on the speech. These actions may include one or more of: retrieving information, storing information, generating a user interface for presentation to the user by way of an output device such as a speaker, moving inventory locations within the facility, moving inventory from one inventory location to another, requesting assistance from another user, and so forth. For example, the speech interaction system may hear the user say to another user "I can't find it" and determine that the user is unable to find a particular item to pick. The speech interaction system may then perform the actions of retrieving information indicating an inventory location of the particular item, generating user interface data including synthesized speech which is then presented using a speaker for the user to hear as an audible user interface. Continuing the example, synthesized speech may announce "The widget on your pick list is located ahead of you on rack A shelf 3." Thus, the user is presented with information which may be useful in performing their tasks in the facility, without having to initiate a query with the inventory management system.

The determination of the one or more actions to perform by the speech interaction system may be based at least in part on a user context. The user context provides information which may provide cues to the speech interaction system to help disambiguate words, determine meaning, select particular actions, and so forth. For example, the user context may include a direction of gaze of the user, proximity to other users, location of the user within the facility, and so forth. The user context may also include information which is specific to the user. For example, the user context may include historical activity such as a list of items picked since entry to the facility today.

The inventory management system may be configured to identify the user. Identification may comprise associating a user with a particular user account. For example, the identification may involve one or more of facial recognition, entry of one or more login credentials such as the username and password, detection of a tag receiving data stored within the tag such as a radiofrequency identification (RFID) chip, and so forth. Once identified, the user context may also include user data which is specific to a particular identity. For example, the user data may include demographic data such as the user's age, relationship data indicative of a relationship between the identified user and another person, user preferences indicative of a preferred language, preferred wordbase, and so forth. Continuing the example, when the user's preferred language is English and the preferred wordbase is British English, audio data of the phrase "where is the torch" as added by the user may be correctly interpreted as an inquiry to find a flashlight item, and information indicating the location of the flashlight item may be presented in a user interface. In another example, the relationship data may provide additional meaning or context within which an appropriate action may be selected. For example, relationship data indicating that the user is a supervisor of a second user may result in interpretation of the phrase "could you please pick the widget from our overstock area" as an order to change the pick location for the item to the inventory location in the overstock area. In contrast, where the relationship data indicates that the user is a subordinate of the second user, the action may comprise presenting a user interface to the second user which includes a prompt to confirm the change in pick location.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein enable actions to be performed in the facility such as information presentation or movement of inventory in a way which is meaningful, unobtrusive, and responsive to the user without the user specifically requesting those actions. The speech interaction system may improve overall operation of the inventory management system, improve the experience of the users, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another. Continuing the example, the inventory location 114 may move from one aisle 112 to another, from one position within an aisle 112 to another, and so forth.

One or more users 116 and totes 118 or other material handling apparatus may move within the facility 102. For example, the user 116 may move about within the facility 102 to pick or place the items 104 in various inventory locations 114, placing them on the tote 118 for ease of transport.

Instead of or in addition to the users 116 other mechanisms such as robots, forklifts, cranes, aerial drones, conveyors, elevators, pipes, and so forth, may move items 104 about the facility 102. For example, a robot may pick the item 104 from a first inventory location 114(1) and move it to a second inventory location 114(2).

The one or more users 116 may play different roles in the operation of the facility 102. For example, some users 116 may be tasked with picking or placing items 104 while other users 116 support the operation of the facility 102 by assisting other users 116. Furthermore, the roles of a particular user 116 may change over time. For example the user 116(1) may start out as an assistant and later be tasked as a supervisor.

Different relationships may exist between users 116. For example the user 116(1) may be a supervisor of the user 116(2). In another example, the user 116(1) may be a sibling, spouse, friend, or otherwise be related to the user 116(2).

One or more sensors 120 may be configured to acquire information in the facility 102. The sensors 120 may include, but are not limited to, microphones, imaging sensors, weight sensors, radio frequency (RF) receivers, temperature sensors, humidity sensors, vibration sensors, and so forth. The sensors 120 may be stationary or mobile, relative to the facility 102. For example, the inventory locations 114, the totes 118, or other devices such as user devices may contain microphones configured to acquire audio data. In another example, the inventory locations 114 may contain imaging sensors configured to acquire images of pick or placement of items 104 on shelves. The sensors 120 are discussed in more detail below with regard to FIG. 2.

During operation of the facility 102, the sensors 120 may be configured to provide information suitable for tracking how objects move within the facility 102. For example, a series of images acquired by an imaging sensor may indicate removal of an item 104 from a particular inventory location 114 by the user 116 and placement of the item 104 on or at least partially within the tote 118. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. For example, in some implementations multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The user 116 may produce communicative sounds while at the facility 102. For ease of illustration and not necessarily by way of limitation the communicative sounds are referred to herein as "speech" and may include, but are not limited to, audible verbalizations, non-lexical utterances, and so forth. The non-lexical utterances may include sighs, gasps, grunts, clicks, pops, or other sounds generated by the user 116. Other communicative sounds may include those generated by an action of the user 116, such as fingersnaps, handclaps, foot stomps, and so forth.

The inventory management system 122 may include a speech interaction system 124 configured to access user context data 126 which is indicative of a user context to process user speech 128 in the audio data, and perform one or more actions. In some implementations, the one or more actions may include selecting one or more output devices 130 and processing user interface data to produce a user interface 132 for presentation to the user 116. The speech interaction system 124 may include a speech recognition module, voice recognition module, a natural language understanding (NLU) module, a semantic analysis module, or other modules. The speech recognition module is configured to process audio of the user speech 128 and produce text or commands representative of the speech. The voice recognition module is configured to distinguish one user 116 from another user 116 based on the sounds emitted by the user 116. The NLU module is configured to parse the information generated by the modules, such as from the speech recognition module, to generate information indicative of meaning of the user speech 128. The NLU module may use Hidden Markov Models (HMMs), neural networks, or other techniques to generate speech from the audio. For example, neural networks may be used to pre-process the audio data and perform functions such as feature transformation, dimensionality reduction, and so forth, with the resulting output used for HMM-based recognition.

The user context data 126 may include information about one or more of: operation of the facility 102, data about the items 104, the user 116 as an anonymous individual, the user 116 as an identified individual, data external to the facility 102 such as weather or delivery route information, and so forth. For example, the user context data 126 may include position data indicative of a location of the one or more users 116 within the facility 102. In another example, of the user context data 126 may comprise user data such as user preferences which have been previously acquired and stored.

The user context data 126 may include data indicative of one or more items 104 within the facility 102 that the user 116 is interacting with. The interaction may include direct physical manipulation, such as picking up or touching the item 104. The interaction may include looking at the item 104, pointing, or gesturing at the item 104. The interaction may include items 104 which are within a predetermine distance of the user 116, such as within 2 meters.

In some implementations the user context data 126 may include information from other users 116 or groups of users 116 who have been determined to be similar in one or more respects. For example, the user context data 126 may include information such as user preferences as set by other users 116 with similar demographic data, who have similar access permissions, who were in about the same location within the facility 102, and so forth. This information may be used in place of information which is not yet available about the user 116, or may supplement information associated with the user 116.

The user context data 126 may be used by the speech interaction system 124 to facilitate the functions thereof, such as recognizing words and determining meaning of the user speech 128. The user context data 126 provides information which may provide cues to help disambiguate words, determine meaning, select particular actions, and so forth. For example, the user context data 126 may include a direction of a gaze of the user 116 which is indicative of a particular item 104 the user 116 is looking at. Using this information, the speech interaction system 124 may disambiguate the user speech 128 of "what is that" to determine that the user 116 is uncertain as to some attribute of the item 104. For example, the user context may include a direction of a gaze of the user 116, proximity to other users 116, location of the user 116 within the facility 102, and so forth. The user context may also include information which is specific to the user 116. For example, the user context may include historical activity such as a list of items picked since entry to the facility 102 today.

The user context data 126 may be used by the speech interaction system 124 to modify statistical models, assign weights in neural networks, select speech recognition lexicons indicative of how words are pronounced, select speech recognition grammars indicative of an expected form or structure of spoken words, and so forth. In implementations where the speech interaction system 124 uses HMM-based recognition techniques, the user context data 126 may be used to configure one or more of the HMMs in the module. For example, the user context data 126 may be used to modify weightings in context dependency for phonemes, to assign weightings to possible transcriptions of the speech, and so forth. Continuing the example, the user context data 126 may be used to assess which ones of a set of possible transcriptions should be retained. Thus, where the user context data 126 indicates the user 116 has a gaze directed at a product in the category "ice cream", the transcription of "ice cream" may be retained while transcriptions "I scream", "eye screem", "ice ream", and "high screen" are disregarded.

A user device 134 may also be present within the facility 102. The user device 134 may be provided by the user 116, or may be provided by an operator of the facility 102 or another entity for use by the user 116. The user device 134 may comprise a tablet computer, smartphone, notebook computer, data access terminal, wearable computing device, and so forth. The user device 134 may be used to acquire audio data, process user interface data to present the user interface 132, or provide other functions. For example, information from the user device 134 such as message data, call metadata, application state data, and so forth may be included in the user context data 126.

The user 116 may benefit from various actions taken by the inventory management system 122 responsive to user speech 128. For example, as the user 116(1) moves about the facility 102 speaking to another person such as the user 116(2) or another system, the speech interaction system 124 may process the user speech 128 and determine actions such as presenting information as output, moving inventory locations 114 or items 104, and so forth. Instead of the user 116 explicitly querying inventory management system 122, the system may instead determine and perform the actions unobtrusively. As a result, the experience of the user 116 in the facility 102 may be improved, efficiency of the facility's 102 operation may be improved, or other benefits may accrue.

Figure 2:
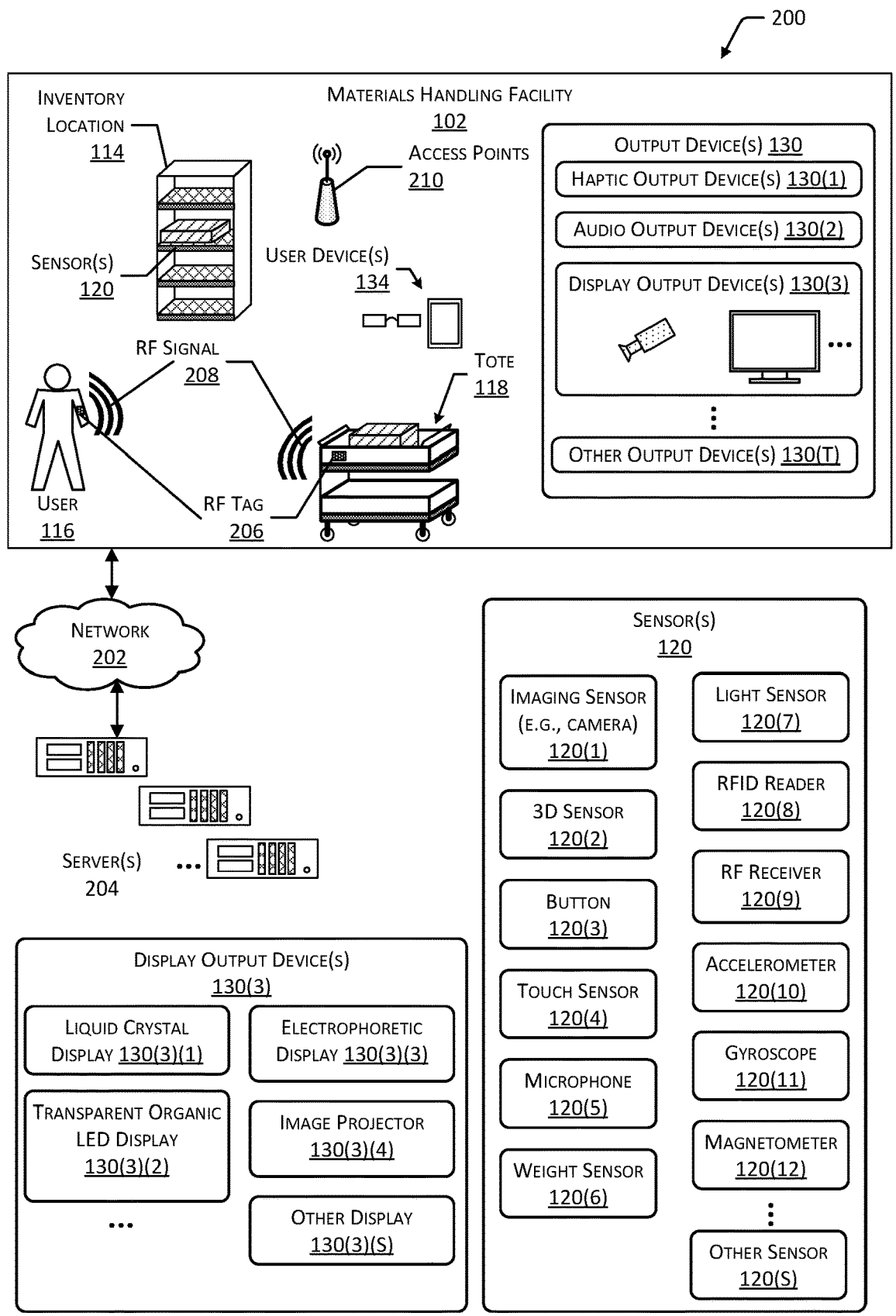
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a position of the object, and so forth. For example, the users 116 may wear RF tags 206, the totes 118 may have RF tags 206 affixed, and so forth which may be read and, based at least in part on signal strength, used to determine identity and position. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote 118, in the user device 134, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects, determine a position of an object, and so forth. For example, the user context data 126 may include a position of the user 116 in three-dimensional space within the facility 102.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) configured such that the button 120(3) may be activated by the user 116.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position of that change in electrical resistance within the material may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire audio data indicative of sound present in the environment. The sound may include the user speech 128 uttered by the user 116. In some implementations, arrays of microphones 120(5) may be used. These arrays may implement beamforming techniques to provide for directionality of gain. The speech interaction system 124 may use the one or more microphones 120(5) to accept voice input from the users 116, determine the position of one or more users 116 in the facility 102, and so forth. For example, the microphones 120(5) may use time difference of arrival (TDOA) techniques to localize a position of a sound.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determine a location of an object, maintain shipping records, and so forth.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 130.

One more radio frequency identification (RFID) readers 120(8), near field communication (NFC) systems, and so forth may also be provided in the sensors 120. For example the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as the user device 134.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth may be determined using the accelerometers 120(10).

A gyroscope 120(11) provides information indicative of rotation of an object affixed thereto. For example, the tote 118, the user device 134, or other objects may be equipped with a gyroscope 120(11) to provide user context data 126 indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, the user device 134, and so forth. For example, the magnetometer 120(12) in the user device 134 as worn by the user 116(1) may act as a compass and provide information indicative of which way the user 116(1) is facing.

The sensors 120 may include other sensors 120(S) as well. For example the other sensors 120(S) may include proximity sensors, ultrasonic rangefinders, thermometers, barometric sensors, hygrometers, or biometric input devices including, but not limited to, fingerprint readers or palm scanners.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the user devices 134, the RF tag 206, a communication device of the tote 118, or other devices.

The output devices 130 may also be provided in the facility 102. The output devices 130 are configured to generate signals which may be perceived by the user 116.

Haptic output devices 130(1) are configured to provide a signal which results in a tactile sensation of the user 116. The haptic output devices 130(1) may use one or more mechanisms such as electrical stimulation or mechanical displacement to provide the signal. For example, the haptic output devices 130(1) may be configured to generate a modulated electrical signal which produces an apparent tactile sensation in one or more fingers of the user 116. In another example, the haptic output devices 130(1) may comprise piezoelectric or rotary motor devices configured to provide a vibration which may be felt by the user 116.

One or more audio output devices 130(2) are configured to provide acoustic output. The acoustic output includes one or more of infrasonic sound, audible sound, or ultrasonic sound. The audio output devices 130(2) may use one or more mechanisms to generate the sound. These mechanisms may include, but are not limited to: voice coils, piezoelectric elements, magnetostrictive elements, or electrostatic elements, and so forth. For example, a piezoelectric buzzer or a speaker may be used to provide acoustic output.

The display devices 130(3) may be configured to provide output which may be seen by the user 116, or detected by a light-sensitive detector such as an imaging sensor 120(1) or light sensor 120(7). The output may be monochrome or color. The display devices 130(3) may be emissive, reflective, or both. An emissive display device 130(3) is configured to emit light during operation. For example, a light emitting diode (LED) is an emissive visual display device 130(3). In comparison, a reflective display device 130(3) relies on ambient light to present an image. For example, an electrophoretic display is a reflective display device 130(3). Backlights or front lights may be used to illuminate the reflective visual display device 130(3) to provide visibility of the information in conditions where the ambient light levels are low.

Mechanisms of the display devices 130(3) may include liquid crystal displays 130(3)(1), transparent organic light emitting diodes (LED) 130(3)(2), electrophoretic displays 130(3)(3), image projectors 130(3)(4), or other display mechanisms 130(3)(S). The other display mechanisms 130

(3)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 130(3) may be configured to present images. For example, the display devices 130(3) may comprise a pixel-addressable display. The image may comprise at least a two-dimensional array of pixels, or a vector representation of an at least two-dimensional image.

In some implementations, the display devices 130(3) may be configured to provide non-image data, such as text characters, colors, and so forth. For example, a segmented electrophoretic display, segmented LED, and so forth may be used to present information such as a SKU number. The display devices 130(3) may also be configurable to vary the color of the text, such as using multicolor LED segments.

In some implementations, display devices 130(3) may be configurable to provide image or non-image output. For example, an electrophoretic display 130(3)(3) with addressable pixels may be used to present images of text information, or all of the pixels may be set to a solid color to provide a colored panel.

The output devices 130 may include hardware processors, memory, and other elements configured to present a user interface 132. In one implementation, the display devices 130(3) may be arranged along the edges of inventory locations 114. The speech interaction system 124 may hear user speech 128 such as "where is that widget" and may be configured to present arrows on the display devices 130(3) which point to the inventory location 114 which contains the "widget" item 104.

Other output devices 130(T) may also be present. The other output devices 130(T) may include lights, scent/odor dispensers, document printers, three-dimensional printers or fabrication equipment, and so forth. For example, the other output devices 130(T) may include lights which are located on the inventory locations 114, the totes 118, and so forth. Continuing the example, the action of the speech interaction system 124 may comprise activating one or more lights on the tote 118 to navigate the user 116 through the facility 102 to a particular location.

The inventory management system 122 may generate the user interface data which is then used by the output device 130, the user devices 134, or both to present a user interface 132. The user interface 132 may be configured to stimulate one or more senses of the user 116. For example, the user interface 132 may comprise visual, audible, and haptic output.

Figure 3:
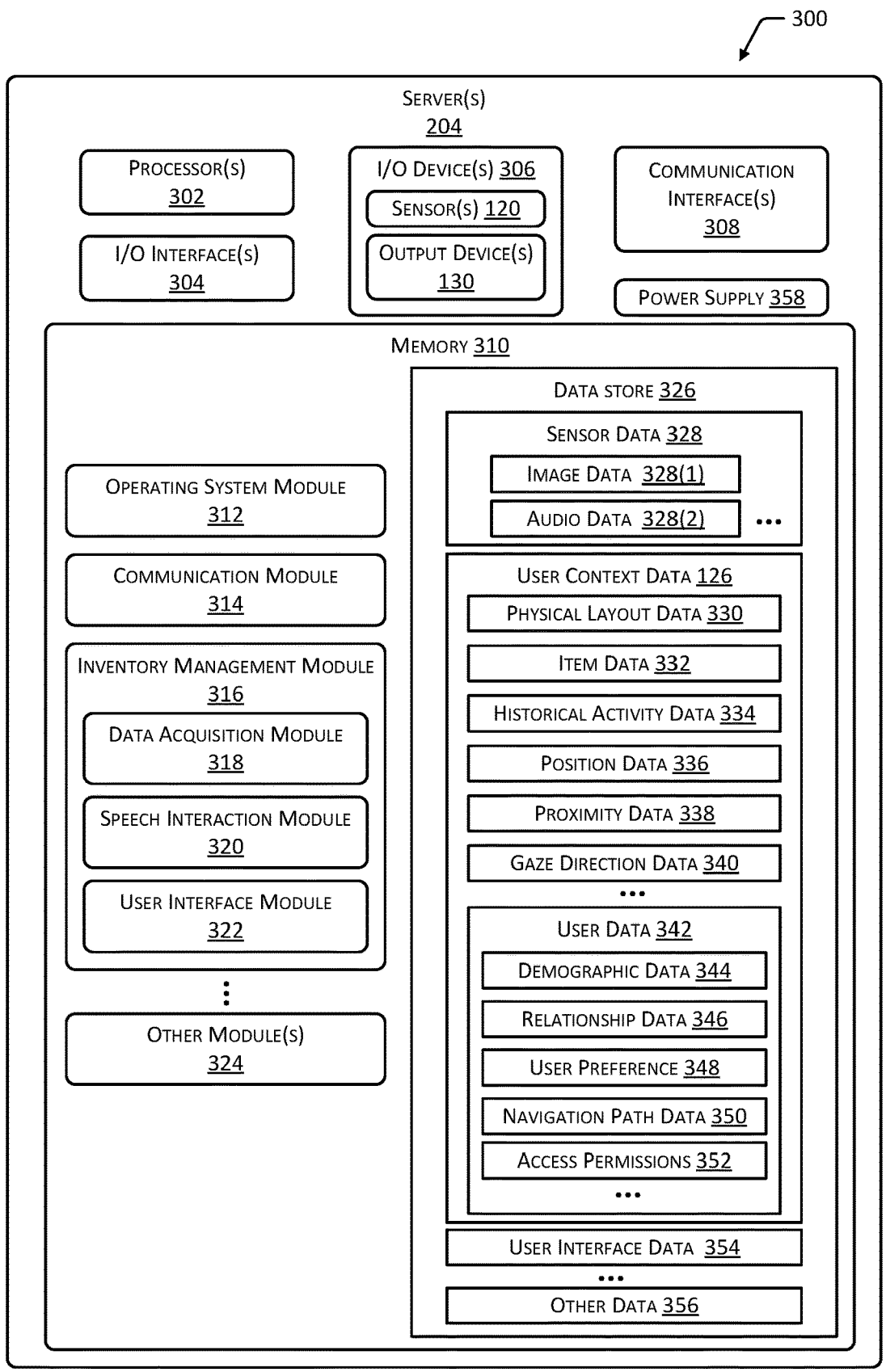
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, the sensors 120, and so forth. The I/O devices 306 may also include output devices 130 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, the user devices 134, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, one or more of the user devices 134, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth.

The inventory management module 316 may be configured to generate the user interface data which may be used by the output devices 130, user devices 134, and so forth to present the user interface 132. The inventory management module 316 may include one or more of a data acquisition module 318, a speech interaction module 320, or a user interface module 322.

The data acquisition module 318 is configured to acquire input from one or more of the sensors 120. For example, the data acquisition module 318 may be configured to receive image data 328(1) from the imaging sensors 120(1) and audio data 328(2) generated by the microphones 120(5). In some implementations, the data acquisition module 318 may analyze the sensor data 328 to generate additional information. For example, the data acquisition module 318 may use one or more techniques to localize or determine a position from which a sound emanates. These techniques may include beamforming using an array of a plurality of microphones 120(5), time difference of arrival (TDOA), analysis of a phase of sounds received by the array of microphones 120(5), and so forth.

The data acquisition module 318 may also be configured to acquire information from the user device 134. In one implementation, the user device 134 may include an application module or operating system configured to provide information about messages sent or received by the user 116 of the user device 134, application state such as whether a particular application is executing and if so what portion of the user interface 132 is being presented, and so forth. For example, the user device 134 may include an instant messaging application which is used to provide communication between users 116 of the facility 102 and other parties such as customers. The user device 134 in this example may be configured to provide to the data acquisition module 318 information indicative of messages sent or received by the user device 134. The information acquired may be incorporated into the user context data 126 for use in processing the user speech 128 to perform one or more actions within the facility 102.

The speech interaction system 124 may be implemented as the speech interaction module 320. The speech interaction module 320 processes the sensor data 328 to determine intent, meaning, actors, or other aspects of the user speech 128. Once determined, particular actions may be selected and then initiated. These actions may include, but are not limited to, storing data, retrieving data, activating one or more mechanisms within the facility 102, directing other users 116 of the facility 102, and so forth.

To facilitate the determination, the speech interaction module 320 may access the user context data 126. The speech interaction module 320 processes user speech 128 which may not be specifically directed to the inventory management module 316. Rather, the user speech 128 is incidental to the presence of the user 116 in the facility 102. The user speech 128 may comprise the self-speak or muttering of the user 116 while alone, a conversation between the two users 116 in the facility 102, a conversation between the user 116 in the facility 102 and another person elsewhere such as via telephone, and so forth. The natural language as expressed by the user 116 in the user speech 128 may be highly variable in terms of wordbase, lexicon, grammar, syntax, and so forth. For example, when the user 116 is specifically addressing a traditional speech recognition system the user 116 may speak with a particular syntax and grammar. In comparison, when the user 116 is speaking to another person a looser or more complicated syntax and grammar may be used, such as that involving slang, idiom, allusion, personal references, and so forth.

To process the user speech 128, the speech interaction module 320 may access the user context data 126 to determine a natural language understanding of the user speech 128. The user context data 126 provides cues or information which may be used to determine wordbase, grammar, syntax, personal references, and so forth. For example, the user context data 126 may comprise information indicative of an item 104(1) in the inventory location 114(1) which the user 116(1) is pointing at with an index finger. Based on this information, the speech interaction module 320 may process user speech 128 of "what's wrong with that?" to determine that the user 116 is inquiring about the status of the item 104(1) in the inventory location 114(1) and initiate an action which generates a user interface 132 which presents information about the status of the item 104(1).

The speech interaction module 320 may analyze the user speech 128 to determine whether the user speech 128 is directed to no one else (e.g., self-speech such as talking to oneself), to another user 116, to an automated system, and so forth. The analysis may include assessment of attributes such as intonation, speaking rate, fluency, perplexity, and so forth to determine or suggest an intended recipient of the user speech 128. For example, the intonation describes variation in spoken pitch as distinct from phonemes while the speaking rate indicates how fast the user 116 is generating communicative sounds. Perplexity may be indicative of relative complexity of the language models used to process the user speech 128. For example, the perplexity may be indicative of, on average, how many different equally most probable words can follow any given word. Higher values of perplexity may be indicative of an increase in the information encoded in the user speech 128.

One or more thresholds may be set for these attributes and used to distinguish self-speech, conversation with another user 116, interaction with another automated system, and so forth. For example, user speech 128 which exhibits average speaking rate of above 120 words per minute, variation in intonation exceeding 10%, and high perplexity may be designated as user-to-user speech and may be analyzed accordingly using user context data 126 of the users 116 involved. In comparison, the user speech 128 which exhibits an average speaking rate of between 80 and 120 words, has intonation with variability below 10%, and a high perplexity may be deemed to be self-talk, such as the user 116 speaking to himself.

The user interface module 322 is configured to generate user interface data. The user interface data may be based at least in part on output from the speech interaction module 320. For example, the speech interaction module 320 may retrieve information responsive to the user speech 128 and pass this information to the user interface module 322 for generation of user interface data and subsequent presentation of the user interface 132. In some implementations, the user interface 132 may provide information associated with one or more of: contemporaneous user speech 128 or previous user speech 128. For example, the user interface 132 may present visually on a display output device 130(3) a listing of the last ten actions taken responsive to user speech 128. The user interface 132 may also be configured to accept information from the user 116, such as an indication as to whether the action taken was helpful. As described below, this input may be used to train the speech interaction module 320.

As described above, the user interface data is configured to provide the user interface 132 by way of one or more output devices 130, user devices 134, or a combination thereof. The user interface 132 may include one or more of haptic, audible, or visual stimuli. For example, the user interface 132 may be audible such that synthesized speech is generated by the user interface module 322 and presented by the audio output devices 130(2).

In some implementations the speech interaction module 320 may be unable to resolve the user speech 128 to a single action. For example, the user speech 128 as interpreted with regard to the user context data 126 may have two or more equally valid actions. In some implementations a single action may be selected, or one or more of the actions may be taken. For example, the speech interaction module 320 may be unable to resolve whether the user 116 is having trouble finding the item 104 "widget" on the shelf, or whether the user 116 would like to change a quantity of the widgets for picking. The speech interaction module 320 may be configured to take multiple actions, such as providing navigational cues to the user 116 to find the item 104 and presenting in the user interface 132 controls which allow for changing the quantity of the widgets on the pick list.

Other modules 324 may also be present in the memory 310. For example, an object recognition module may be configured to use data from one or more of the sensors 120 to identify an object such as the item 104, the user 116, the tote 118, and so forth.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices and so forth.

The data store 326 may also include sensor data 328. The sensor data 328 comprises information acquired from, or based on, the one or more sensors 120. For example, the sensor data 328 may comprise three-dimensional information about an object in the facility 102. As described above, the sensors 120 may include an imaging sensor 120(1) which is configured to acquire one or more images. These images may be stored as image data 328(1). The image data 328(1) may comprise information descriptive of a plurality of picture elements or pixels. The microphones 120(5) are configured to acquire audio data 328(2) which is representative of sounds at the facility 102. The audio data 328(2) may include user speech 128, movement sounds, equipment sounds, and so forth.

In some implementations, the sensor data 328 may be acquired at least in part by the user devices 134. For example, the data acquisition module 318 may receive image data 328(1) and audio data 328(2) from an imaging sensor 120(1) and a microphone 120(5) which are onboard a tablet computer of the user 116.

The data store 326 may also store the user context data 126. In some implementations, a portion of the user context data 126 may be retrieved from other data stores or devices. The user context data 126 is configured to provide information about one or more of: operation of the facility 102, data about the items 104, the user 116 as an anonymous individual, the user 116 as an identified individual, data external to the facility 102 such as weather or delivery route information, and so forth.

The user context data 126 may include physical layout data 330. The physical layout data 330 provides a mapping of physical positions within the facility 102 of devices and objects such as the sensors 120, inventory locations 114, and so forth. For example, the physical layout data 330 may indicate the coordinates within the facility 102 of an inventory location 114, an RFID reader 120(8) close to that inventory location 114, and so forth. In some implementations, the inventory management module 316 may access the physical layout data 330 to determine a distance between two objects, such as the users 116(1) and 116(2).

Item data 332 may also be included in the user context data 126. The item data 332 comprises information associated with the items 104. The information may include one or more inventory locations 114, at which one or more of the items 104 are stored. The item data 332 may also include order data, SKU or other product identifier, price, quantity on hand, weight, expiration date, images of the item, detailed description information, ratings, ranking, and so forth. The inventory management module 316 may store information associated with inventory management functions in the item data 332. The speech interaction module 320 may be configured to retrieve information about the items 104 which are mentioned in, or relevant to, the user speech 128.

The user context data 126 may also include historical activity data 334, position data 336, proximity data 338, or gaze direction data 340. The historical activity data 334 provides information about the user's 116 interactions with the facility 102 and the objects therein, such as the items 104, the inventory locations 114, other users 116, the totes 118, and so forth. For example, the historical activity data 334 may indicate a time of entry to the facility 102, a route taken while in the facility 102, a list of items 104 which have been picked or placed, and so forth. The historical activity data 334 may be associated with the user 116 which has been identified or unidentified. In some implementations, the historical activity data 334 may be retrieved, such as in the circumstance of an identified user 116. For example, the user 116 may be identified upon entry to the facility 102. After identification, historical activity data 334 associated with a user account of the user 116 may be retrieved from the data store 326. The speech interaction module 320 may use the historical activity data 334 to ascertain what or whom the user 116 has interacted with in the facility 102.

The position data 336 comprises information indicative of the user's 116 position in the facility 102. The position data 336 may be expressed in absolute terms or relative terms. Absolute terms may comprise a latitude, longitude, and altitude with respect to a geodetic reference point. Relative terms may include a position of 25.4 m along an x-axis and 75.2 m along a y-axis as designated by a floor plan of the facility 102, 5.2 m from an inventory location 114 along the heading of 169°, and so forth. The position data 336 may be used by the speech interaction module 320 to determine user context data 126. For example, based on the position data 336 in the facility, and using the information about inventory locations 114 and the corresponding items 104 therein, the speech interaction module 320 may determine the user context data 126 includes the items 104 which are nearby.

The proximity data 338 provides information which is indicative of a spatial arrangement between the user 116 and another person. For example, the proximity data 338 may indicate that the user 116(1) is within a threshold distance of the user 116(2). In some implementations, the threshold distances may be specified for individual users 116. The threshold distances may be static or dynamically adjusted. For example, the threshold distance may be configured to 3 m from users 116 which are unrelated, and 1 m from the users 116 which have a familial relationship. The speech interaction module 320 may use the proximity data 338 to process the user speech 128. For example, the user 116(1) may say the user speech 128 "what do you have to pick next?" Based at least in part on the proximity data 338 indicating that the user 116(2) is within a threshold distance and no other users 116 are within the threshold distance, the speech interaction module 320 may perform several actions. These actions may include accessing information indicative of the user's 116(2) pick list and presenting a user interface 132 which displays the information about the next item 104 on the user device 134(2) associated with the user 116(2).

The gaze direction data 340 provides information indicative of a direction the user 116 is looking. In some implementations, the gaze direction data 340 may be determined by processing the image data 328(1) of one or more eyes of the user 116. Based at least in part on the position data 336 of the user 116 and the gaze direction data 340, it may be determined what object the user 116 is looking at. By using this information, the speech interaction module 320 may be able to disambiguate user speech 128. For example, the user 116(1) may be a supervisor who utters the user speech 128 "please get me another tote" while looking at the user 116(3) who is several meters away. The speech interaction module 320 may use the gaze direction data 340 to determine that the user 116(1) is addressing the user 116(3), and may perform the actions of providing a user interface 132 which is indicative of a closest tote 118.

In other implementations, other directional data associated with the user 116 may be determined. For example, the directional data may indicate overall orientation of the user's 116 body, the direction of their head, and so forth.

The user context data 126 may also include user data 342. The user data 342 comprises information which is specific to an identified user 116. Once the user 116 has been identified, the user data 342 associated with that identity may be retrieved. The user data 342 may include demographic data 344, relationship data 346, user preferences 348, navigation path data 350, access permissions 352, or other information.

The demographic data 344 may comprise information indicative of the user's 116 skills, address, contact information, age, and so forth. The relationship data 346 provides information indicative of an association between the user 116 and other users or people. For example, the relationship data 346 may indicate the users 116(1) and 116(2) are supervisor and subordinate, respectively. In another implementation, the relationship data 346 may indicate that the users 116(1) and 116(2) share a familial or marital relationship, such as being spouses or siblings. The relationship data 346 may be used by the inventory management module 316 in various ways. For example, the relationship data 346 may be accessed to prevent having related individuals crosscheck one another's picking of a high-value item 104. The speech interaction module 320 may use the relationship data 346 to disambiguate, determine meaning, or otherwise process the user speech 128.

The user preferences 348 may include information such as preferred colors for visual display, preferences as to the timbre of a synthesized voice, preference for audible output over visual output, threshold distances for different actions, and so forth. For example, the user preference 348 may include threshold distance data indicating that the user 116(1) prefers a visual user interface 132 when other users 116 are within a 3 m threshold distance and an audible user interface 132 when the other users are beyond the 3 m threshold distance. The thresholds may be modified based on the physical layout data 330. For example, the threshold distance may be within a "line of sight", such as between users 116 which are within the same aisle 112 as compared to users 116 which are in adjacent aisles.

The navigation path data 350 provides information indicative of an actual, scheduled, or predicted path of the user 116 through the facility 102. For example, the historical navigation path data 350 may comprise a time series of waypoints of the user 116 within the facility 102 over a period of elapsed time. The waypoints may specify a location within the facility 102. The historical navigation path data 350 provides information showing where the user 116 has been within the facility 102.

Scheduled navigation path data 350 provides information as to what path the user 116 is being directed to follow through the facility 102. For example, the scheduled navigation path data 350 may be generated using a list of items 104 to be picked by the user 116. Based at least in part on the physical arrangement of the inventory locations 114 associated with those items 104 in the order as retrieved from the physical layout data 330, a picking path may be specified. In some implementations, the scheduled navigation path data 350 may also comprise a time series indicating estimated positions within the facility 102 at particular times. The routing of the scheduled navigation path data 350 may be configured to optimize one or more parameters of the user's 116 travel through the facility 102. For example, the scheduled navigation path data 350 may be configured to minimize walking distance, reduce congestion at a particular inventory location 114 relative to other users 116, minimize use of other material handling equipment such as pallet jacks or forklifts, and so forth.

Predicted navigation path data 350 provides an estimation as to what path the user 116 will follow through the facility 102 prospectively. In some implementations, the predicted navigation path data 350 may also comprise a time series indicating estimated positions within the facility 102 at particular times. For example, the predicted navigation path data 350 may be based on the historical navigation path data 350 of one or more users 116. Continuing the example, the historical navigation path data 350 may indicate that a significant percentage of the users 116 that have gone past a particular aisle 112, enter that aisle 112 even when no items 104 within the aisle 112 are scheduled for picking. In this example, predicted navigation path data 350 for a particular user 116 may include the assumption that this particular user 116 will also enter that aisle 112.

In some implementations, certain portions of the facility 102 may be blanked out such that position data 336 is not collected, or may have navigation path data 350 associated with those portions redacted from the navigation path data 350. For example, movements within a break room or a restroom are not tracked.

The speech interaction module 320 may use the navigation path data 350 to establish where the user 116 may have been, or may be going next. For example, the user speech 128 may be the user 116(1) saying "my tote is so heavy" aloud. The speech interaction module 320 may determine the inventory location 114 which the user 116(1) is predicted to visit, and may dispatch another user 116(2) to meet the first user 116(1) and help with manipulating the heavily laden tote 118.

The user data 342 may also include access permissions 352 which specify what actions may be performed by a particular user 116 or group of users 116. For example, the user 116(1) may be assigned access permissions 352 commensurate with their responsibilities as a supervisor. These access permissions 352 may allow the supervisor user 116(1) to see detailed information about the tasks currently being performed by other users 116, allow for repositioning of inventory locations 114, and so forth.

In another example, the user 116(1) may have set access permissions 352 restricting dissemination of user data 342 to other users 116. The access permissions 352 may be specified in terms of which users 116 may retrieve user data 342, what user data 342 the particular user 116 chooses to allow others to access, or a combination thereof.

Individual users 116 or groups of users 116 may selectively provide user data 342 for use by the inventory management system 122, or may authorize collection of the user data 342 during use of the facility 102 or access to user data 342 obtained from other systems. For example, a user 116 may opt-in to collection of the user data 342 to receive enhanced services while using the facility 102.

The data store 326 may also store user interface data 354. The user interface data 354 may comprise commands, instructions, tags, markup language, images, color values, text, or other data. For example, the user interface data 354 may be expressed as hypertext markup language (HTML), cascading style sheets (CSS), JavaScript, and so forth. One or more output devices 130, user devices 134, or a combination thereof are configured to use the user interface data 354 to present the user interface 132 which may be perceived by the user 116. The user interface 132 may include one or more elements including visual, haptic, audible, olfactory, and so forth. For example, the user interface 132 may be a graphical user interface, audible user interface, haptic user interface, or a combination thereof.

The data store 326 may also include other data 356. For example, the other data 356 may include information such as configuration files, weather information, loading dock status, tote 118 availability, and so forth.

The server 204 may also include a power supply 358. The power supply 358 is configured to provide electrical power suitable for operating the components in the server 204.

Figure 4:
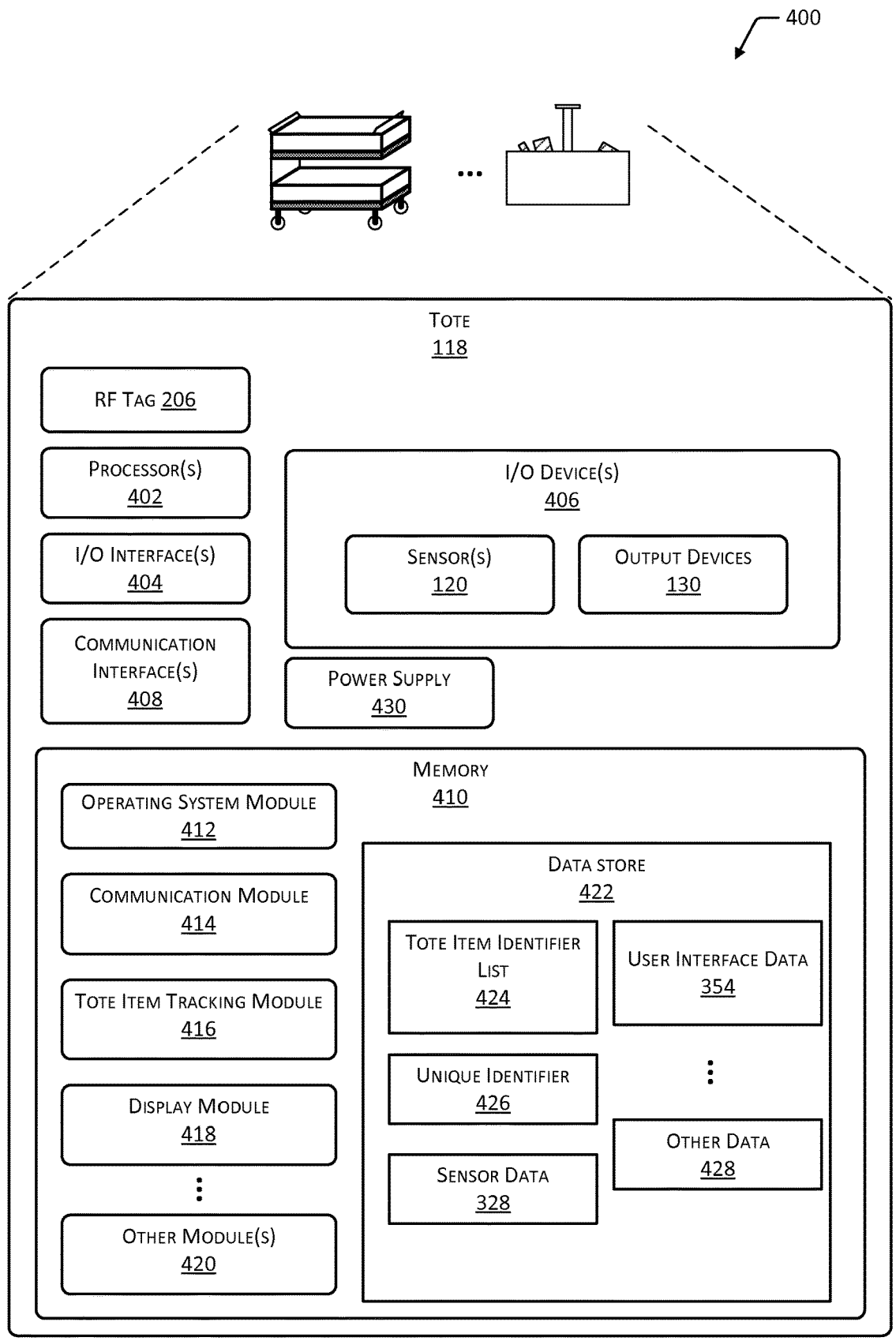
FIG. 4 is a block diagram of a tote, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), and so forth. The I/O devices 406 may also include output devices 130 such as haptic output devices 130(1), audio output devices 130(2), display devices 130(3), and so forth. For example, the tote 118 may include other display devices 130(T) such as lights which may be activated to provide information to the user 116. In some implementations, input and output devices may be combined. For example, a touchscreen display may incorporate a touch sensor 120(4) and a display device 130(3). In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, user devices 134, routers, access points 210, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 412 may be used, such as the Windows operating system from Microsoft Corporation of Redmond, Wash., the LynxOS from LynuxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, other totes 118, the user devices 134, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID or NFC reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface 132 on the display device 130(3) of the tote 118.

The memory 410 may include a display module 418. The display module 418 may be configured to present information, such as received from the one or more servers 204 or generated onboard the tote 118, using one or more of the output devices 130. For example, the display module 418 may be configured to receive user interface data 354 provided by the user interface module 322. By processing user interface data 354, the user interface 132 may be presented to the user 116 by way of the output devices 130 of the tote 118. For example, the user interface 132 may include haptic output from the haptic output devices 130(1), audio output from the audio output devices 130(2), images presented on the display output devices 130(3), activation of lights or other output devices 130(T), or a combination thereof. Continuing the example, the user interface data 354 may be generated by the speech interaction module 320 in response to processing of the user speech 128.

Other modules 420 may also be stored within the memory 410. In one implementation, a data handler module may be configured to generate sensor data 328. For example, an imaging sensor 120(1) onboard the tote 118 may acquire image data 328(1) and one or more microphones 120(5) onboard the tote 118 may acquire audio data 328(2). The sensor data 328, or information based thereon, may be provided to the data acquisition module 318.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth interface. In some implementations, the user interface module 322 may use the unique identifier 426 to determine which tote 118 to generate the user interface 132 upon, or to determine a source for the sensor data 328.

The data store 422 may also store sensor data 328. The sensor data 328 may be acquired from the sensors 120 onboard the tote 118. The user interface data 354 received by the tote 118 may also be stored in the data store 422.

Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
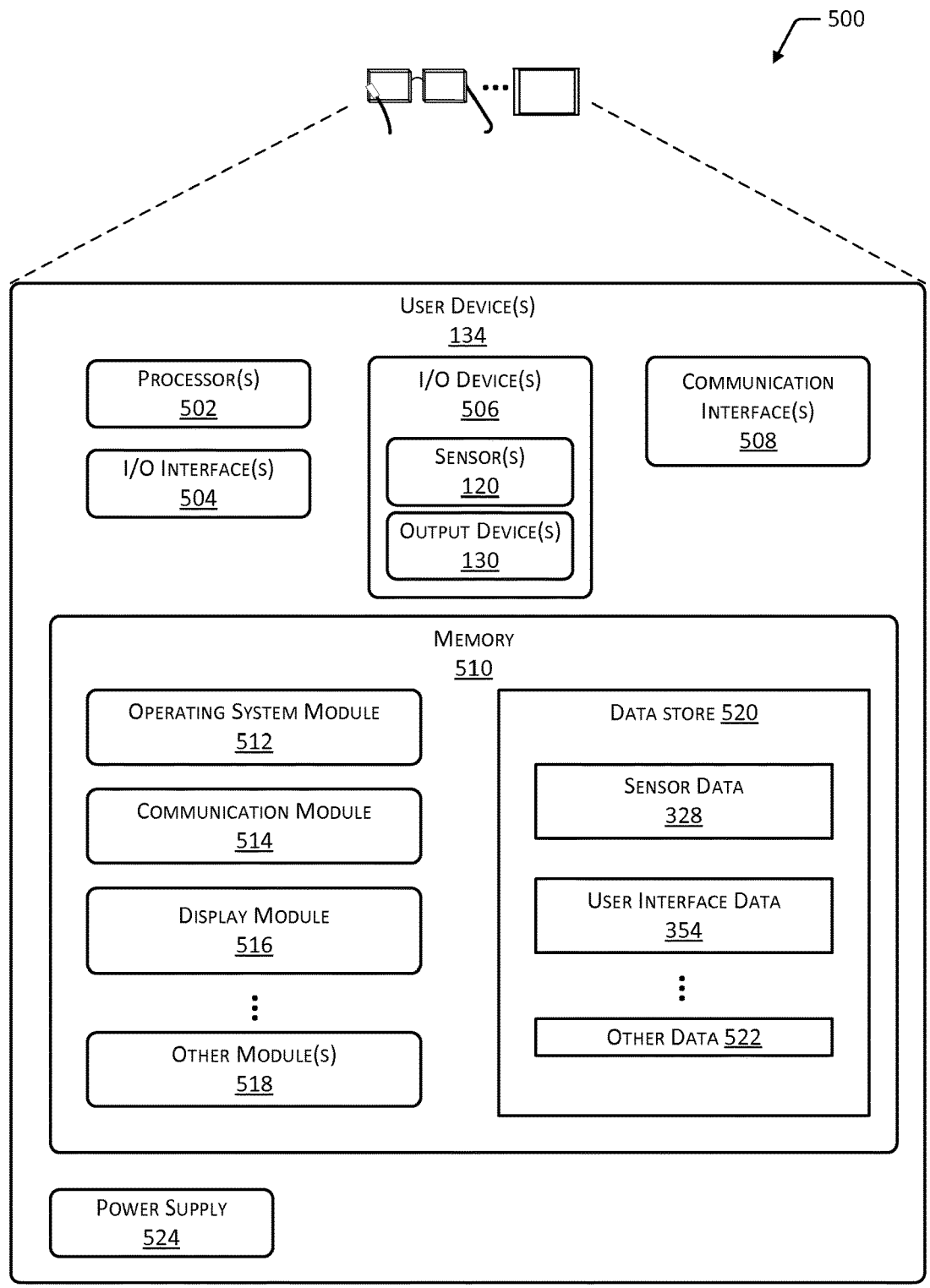
FIG. 5 illustrates a user device configured to acquire information about user context, present information, and so forth, according to some implementations.

FIG. 5 illustrates a block diagram 500 of the user device 134, according to some implementations. The user device 134 may comprise a tablet computer, smartphone, notebook computer, data access terminal, wearable computing device, and so forth. The user device 134 may include one or more hardware processors 502 (processors) configured to execute one or more stored instructions. The processors 502 may comprise one or more cores. The user device 134 may include one or more I/O interface(s) 504 to allow the processor 502 or other portions of the user device 134 to communicate with other devices. The I/O interfaces 504 may include I2C, SPI, USB, RS-232, and so forth.

The I/O interface(s) 504 may couple to one or more I/O devices 506. The I/O devices 506 may include one or more of the input devices such as the sensors 120. As described above, the sensors 120 may include imaging sensors 120(1), 3D sensors 120(2), buttons 120(3), touch sensors 120(4), microphones 120(5), weight sensors 120(6), light sensors 120(7), RFID readers 120(8), accelerometers 120(10), gyroscopes 120(11), magnetometers 120(12), and so forth.

The I/O devices 506 may also include one or more of haptic output devices 130(1), audio output devices 130(2), display devices 130(3), and so forth. For example, the display devices 130(3) may be configured in a head-mounted display, such that the field of vision of the user 116 includes the display device 130(3) as well as one or more of the real-world objects in the facility 102. In some implementations, input and output devices may be combined. In some embodiments, the I/O devices 506 may be physically incorporated with the user device 134 or may be externally placed.

The user device 134 may also include one or more communication interfaces 508. The communication interfaces 508 are configured to provide communications between the user device 134 and other devices, such as other user devices 134, totes 118, routers, access points 210, the servers 204, and so forth. The communication interfaces 508 may include devices configured to couple to PANs, LANs, WANs, and so forth. For example, the communication interfaces 508 may include devices compatible with Wi-Fi, Bluetooth, ZigBee, and so forth.

The user device 134 may also include one or more busses or other internal communications hardware or software that allow for the transfer of data between the various modules and components of the user device 134.

As shown in FIG. 5, the user device 134 includes one or more memories 510. The memory 510 comprises one or more CRSM as described above. The memory 510 provides storage of computer readable instructions, data structures, program modules and other data for the operation of the user device 134. A few example functional modules are shown stored in the memory 510, although the same functionality may alternatively be implemented in hardware, firmware, or as a SOC.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 512 may be used, such as the Windows operating system from Microsoft Corporation of Redmond, Wash., the LynxOS from LynuxWorks of San Jose, Calif., and so forth.

Also stored in the memory 510 may be one or more of the following modules. These modules may be executed as foreground applications, background tasks, daemons, and so forth.

A communication module 514 may be configured to establish communications with one or more of the sensors 120, user devices 134, the servers 204, or other devices. The communications may be authenticated, encrypted, and so forth.

The memory 510 may include a display module 516. The display module 516 may be configured to parse the user interface data 354 and present the user interface 132 using one or more of the output devices 130 which are onboard or communicatively coupled to the user device 134. For example, the display module 516 may include an HTML rendering engine configured to process the HTML in the user interface data 354. The display module 516 may also be configured to modify the user interface 132 based at least in part on sensor data 328 acquired by sensors 120 onboard or communicatively coupled to the user device 134. For example, the display module 516 may be configured to provide some object recognition and tracking, such that user interface elements presented by the display device 130(3) follow the motion of the tracked object, such as the user 116 which is in the field of view.

Other modules 518 may also be stored within the memory 510. In one implementation, a data handler module may be configured to generate sensor data 328. For example, the data handler module may be configured to acquire audio data 328(2) from one or more microphones 120(5) and provide that audio data 328(2) to the data acquisition module 318 of the server 204.

The other modules 518 may also include a facial detection module which may be configured to determine a presence of a human face within the image data 328(1) acquired by the onboard imaging sensor 120(1). The image of the face may then be sent to the server 204 for facial recognition to determine who is present in the image.

The memory 510 may also include a data store 520 to store information. The data store 520 may use a flat file, database, linked list, tree, executable code, script, or other data structure to store the information. In some implementations, the data store 520 or a portion of the data store 520 may be distributed across one or more other devices including the servers 204, other user devices 134, network attached storage devices and so forth.

The data store 520 may store sensor data 328 as acquired from the sensors 120 onboard the user device 134 or communicatively coupled thereto. For example, the sensor data 328 may include image data 328(1) acquired for an onboard imaging sensor 120(1) of the user device 134. The user interface data 354 received by the user device 134 may also be stored in the data store 520. Other data 522 may also be stored within the data store 520. For example, device configuration settings, user interface preferences, and so forth may also be stored.

The user device 134 may also include a power supply 524. The power supply 524 is configured to provide electrical power suitable for operating the components in the user device 134. The power supply 524 may comprise one or more of photovoltaic cells, batteries, wireless power receivers, fuel cells, capacitors, and so forth.

Figure 6:
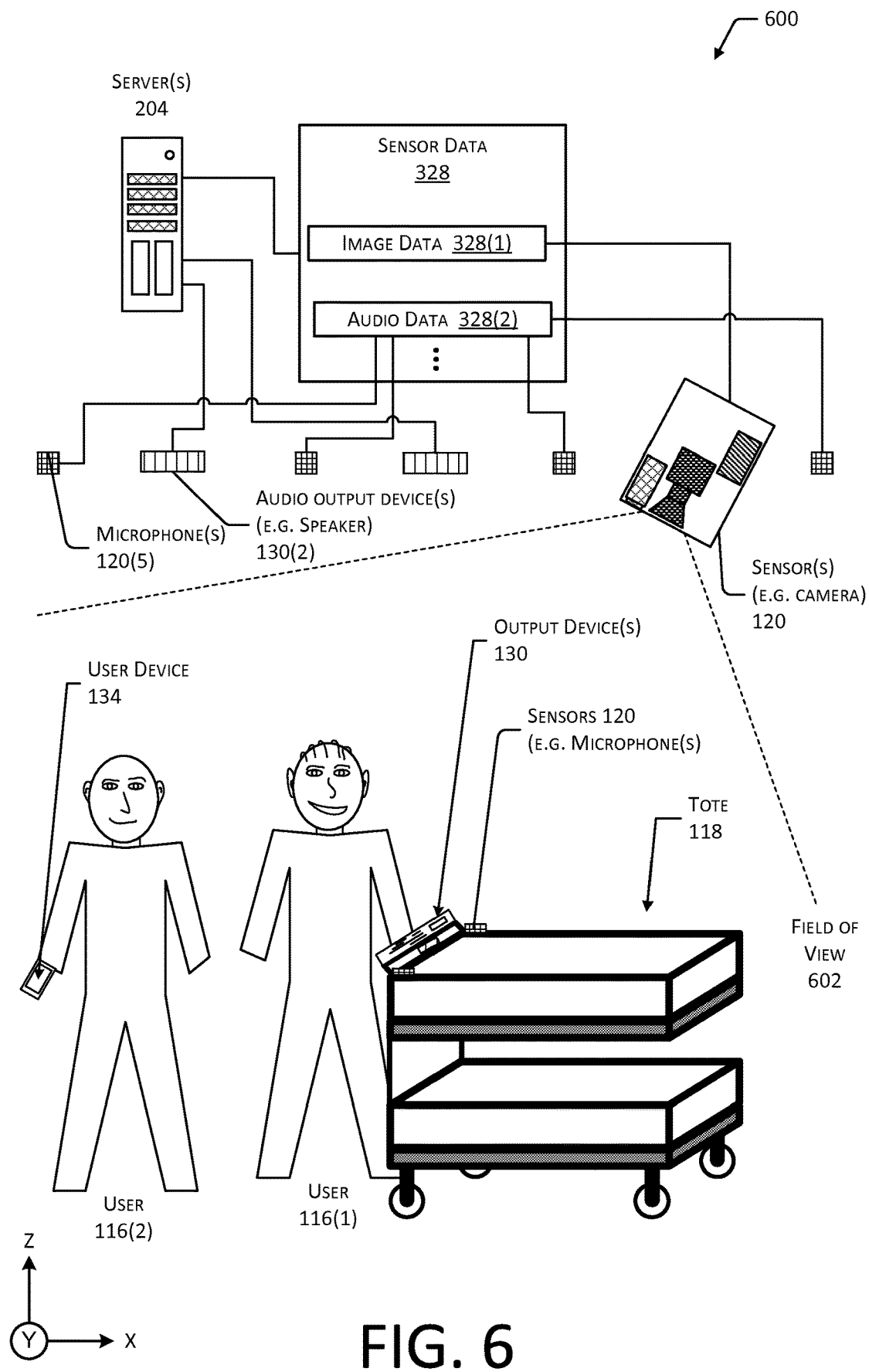
FIG. 6 illustrates an overhead imaging sensor configured to acquire sensor data in the facility, according to some implementations.

FIG. 6 illustrates a side view 600 of an overhead imaging sensor 120(1) acquiring an image of the users 116, the tote 118, and other objects. In some implementations, the facility 102 may include one or more sensors 120 which are configured to acquire an image from an overhead vantage point or at other positions within the facility 102. The sensors 120 may include, but are not limited to, one or more of the imaging sensors 120(1), the 3D sensors 120(2), the microphones 120(5), the RFID readers 120(8), the RF receivers 120(9), and so forth. The sensor data 328 acquired by the sensors 120 may be used to generate the user context data 126.

In this illustration, one of the sensors 120 comprises an imaging sensor 120(1) which is configured to generate image data 328(1). A field of view 602 of the imaging sensor 120(1) depicted here includes the users 116(1) and 116(2) and the tote 118. The image data 328(1) may be provided to the inventory management system 122. For example, the inventory management module 316 executing on the server 204 may process the image data 328(1) to determine at least a portion of the user context data 126, such as the position data 336 for the users 116(1) and 116(2).

The one or more sensors 120 may also include an array of microphones 120(5) configured to generate audio data 328(2). The array of microphones 120(5) may be arranged in a one, two, or three-dimensional arrangement. For example, a three-dimensional arrangement may comprise microphones 120(5) arranged lengthwise along an aisle 112 at ceiling height and also lengthwise down the aisle on middle shelves of the inventory locations 114 for that aisle 112.

The array of microphones 120(5) may be used to localize or determine a position within the space of a particular sound. As described above, the localization may use time difference of arrival (TDOA), phase differences, amplitude comparison, beamforming, or other techniques to determine the position. The position may be determined along a single dimension, along two dimensions, or in three-dimensional space. For example, the position may be determined as a position lengthwise along the aisle 112 as a single dimension. Determination of the position data 336 may be based at least in part on the localization information provided by the array of microphones 120(5). For example, the localized position of the user speech 128 which is associated with the user 116(1) may be combined with position information generated from the image data 328(1) to provide the position data 336.

In some implementations, the data acquisition module 316 may be configured to generate user context data 126 using information from the plurality of sensors 120. For example, image data 328(1) may indicate that the user 116(1) is standing alone and speaking based on facial motions of the user 116(1) and an absence of other human faces. The audio data 328(2) may comprise the user speech 128. RF data from the RF receiver 120(9) as well as information provided by the user device 134 may be indicative of an active cell phone call. Furthermore, the information provided by the user device 134 may indicate that the user 116(1) is talking to the user 116(2) who is designated by the relationship data 346 as being a subordinate of the user 116(1). Based on this user context data 126, the speech interaction module 320 may be able to derive meaning and perform one or more actions responsive to the user speech 128 which comprises the half of the conversation uttered by the user 116(1). Thus, the speech interaction module 320 may be configured to initiate actions responsive to the user speech 128 so long as at least one of the participants is present or otherwise in communication with the facility 102.

As described here, the tote 118 may also include one or more output devices 130, one or more sensors 120, and so forth. Similarly the user device 134 may include one or more output devices 130, one or more sensors 120, and so forth. The data acquisition module 318 may be configured to access the data provided by these sensors 120 while the user interface module 322 may be configured to generate user interface data 354 configured to provide the user interface 132 by way of the output devices 130.

Figure 7:
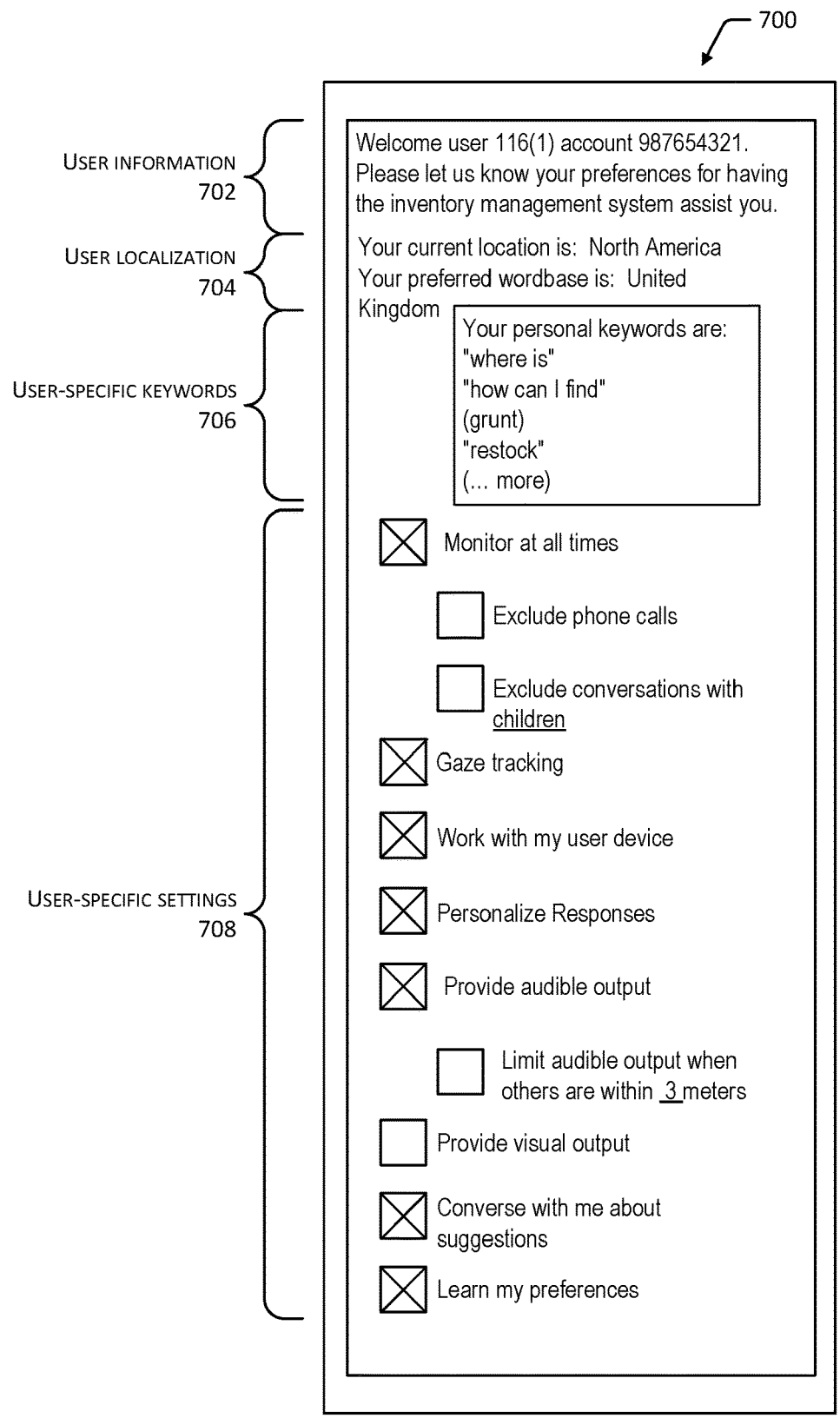
FIG. 7 illustrates a user interface for setting how the facility interacts with the user, according to some implementations.

FIG. 7 illustrates a user interface 700 for setting how the facility 102 interacts with the user 116, according to some implementations. One or more of the output devices 130 may present the user interface 700.

The user interface 700 may allow the user 116 to configure or otherwise set one or more of the user preferences 348. The user information section 702 provides information about the user 116 who is presently accessing the user interface 700 and their account information.

A user localization section 704 allows the user to view, set, or modify information such as a current location, preferred wordbase, and so forth. For example, as shown here the user 116 has a current location of North America indicative of the facility 102 being located within the United States. The preferred word base, in comparison, is that of the United Kingdom. Continuing the example, the user 116 may be a native of the United Kingdom. The wordbase may comprise words and their pronunciations, associated meanings, grammar, and so forth which may have particular regional, cultural, or other significance. For example, a United Kingdom wordbase may indicate that the word "torch" is equivalent to the American word for "flashlight". The wordbase may be determined manually such as by input from the user 116, or may be automatically determined based on analysis of the user speech 128 by the user 116. In some implementations the word base may comprise a data structure which specifies interconnections or relationships between one or more lexicons, grammars, semantic data, and so forth.

The user specific keywords section 706 allows the user to view, set, or modify particular key words or phrases. Keywords or phrases may be associated with particular actions, intents, or states of the user 116. The association of particular keywords to the user 116, groups of users 116, categories of users 116, and so forth, may be automatically determined by the speech interaction module 320. For example, a grunt noise may be associated with frustration of a particular user 116. In other implementations, the user interface 700 may allow the user 116 to specify that the grunt conveys this particular meaning. Responsive to this meaning, the speech interaction module 320 may be configured to provide additional information associated with a task assigned to the user 116 upon processing of the user speech 128 which includes a grunt.

A user specific settings section 708 allows the user to specify other aspects of operation of the speech interaction module 320 or the inventory management module 316. For example, the user 116 may give permission for the speech interaction module 320 to continuously monitor the audio data 328(2) at all times. The user 116 may provide specific limitations such as including or excluding telephone calls, including or excluding conversations with children, and so forth. Other settings may include enabling the user gaze tracking, enabling operation with an application on the user device 134, and so forth.

The user specific settings section 708 may also allow the user 116 to specify whether information provided in the user interface 132 is to be personalized. Personalized information may include the user data 342. For example, a non-personalized user interface 132 may present information such as a SKU and cost of an item 104. In comparison, a personalized user interface 132 may present information such as a last quantity purchased by that user 116.

The user specific settings section 708 may allow the user 116 to specify whether audible output is to be provided, and if so whether to limit that audible output based on proximity data 338 or other parameters. Similarly, the user 116 may specify whether visual output is to be provided, and if so what limits with regard to proximity data 338 are to be applied.

The user 116 may also specify user specific settings section 708 which enables the speech interaction module 322 to engage in an interactive conversation. For example, the user speech 128 may result in retrieval of information about an item 104. The speech interaction module 320 may operate in conjunction with the user interface module 322 to generate the user interface 132 which presents synthesized speech or a visual prompt asking the user 116 for permission to present the retrieved information when this option is enabled. In another example, the speech interaction module 320 may operate in conjunction with the user interface module 322 to ask the user 116 questions or to provide additional information to disambiguate or confirm an action. When not enabled, the system may generate and present the user interface 132 automatically.

The user specific settings section 708 may also enable the speech interaction module 320 to learn from the interactions with the user 116. For example, one or more machine learning techniques may be employed to process speech and determine which actions to provide for particular users 116, all users 116, or a combination thereof. For example, the speech interaction module 320 may process user speech 128 using a neural network to recognize text and determine an action associated therewith.

Feedback may be provided to the machine learning system by monitoring further user speech 128, user context data 126, or a combination thereof. For example, subsequent user speech 128 such as "thank you", "great," or "that's helpful" may provide data which reinforces that the action determined by the speech interaction module 320 was appropriate with respect to the user speech 128. In comparison, a user speech 128 such as "that's wrong" or "nope" may provide data which deprecates the action.

Similarly, subsequent actions by the user 116 following an action by the inventory management system 122 may provide feedback to the speech interaction module 320. For example, the action of moving the item 104(1) close to the user 116, who then subsequently picks up the item 104(1), may reinforce that the user 116 wanted the item 104(1) and that the action of moving the item 104(1) was useful. In another example, the action of the user 116 moving toward the item 104, or the inventory location 114 associated with the item 104, provides feedback which may be analyzed. Similarly, user input from the user interface 132 may also be used to provide feedback to the speech interaction module 320.

Other sections which are not depicted here may be provided in the user interface 700. For example, an access permission section may allow the user 116 to specify one or more of the access permissions 352.

Figure 8:
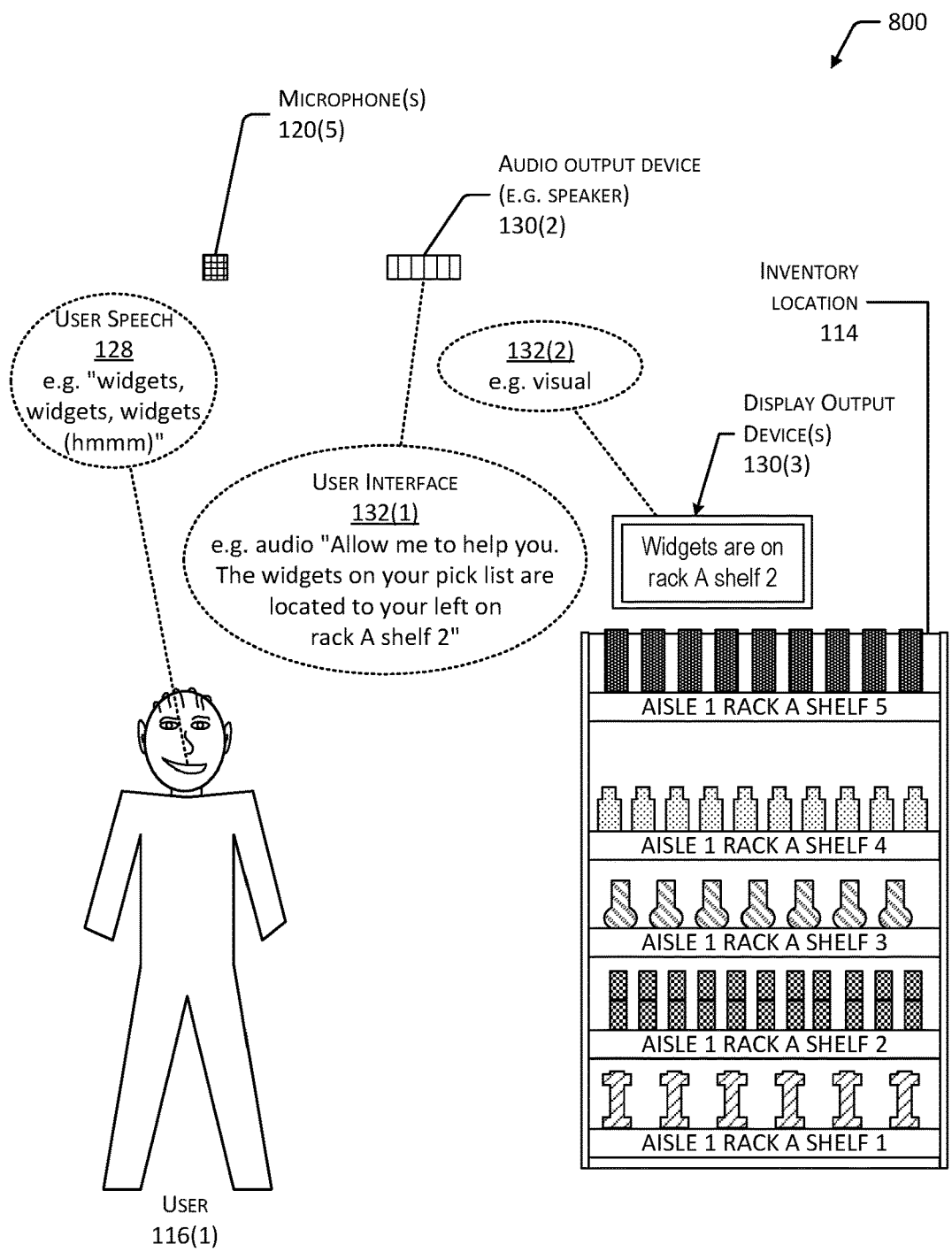
FIG. 8 illustrates user speech and the system responding to this speech, according to some implementations.

FIG. 8 illustrates a scenario 800 of a single user 116 uttering user speech 128 and the system 100 responding to this, according to some implementations. As described above, the facility 102 may include one or more sensors 120 such as microphones 120(5) and one or more output devices 130 such as audio output devices 130(2). In this illustration, a single user 116 is shown in a portion of the facility 102 which includes an inventory location 114 holding various items 104. While working by himself, the user 116 utters user speech 128 such as "widgets, widgets, widgets, (hmmm)". The speech interaction module 320, based on the user context data 126, may interpret the user speech 128 as calling for the action of providing information to the user 116 about the location of the items 104 known as widgets.

As illustrated here, the audio output device 130(2) provides a user interface 132(1) comprising synthesized audio saying "Allow me to help you. The widgets on your pick list are located to your left on rack A shelf 2." Another user interface 132(2) comprising text presented visually reading "Widgets are on rack A shelf 2" and presented on a display output device 130(3) may be presented instead of, or in addition to, the audible user interface 132(1). In some implementations the user 116 may be advised that the speech interaction system 124 has determined a suggested action or is ready to perform an action by a chime, haptic output, change in illumination of a light, and so forth. For example, the speakers on the tote 118 may chime while lights on the tote 118 may blink. The action may be performed, or may be held pending approval or assent by the user 116 to perform the action.

As illustrated in this example, the user 116 has not explicitly engaged the system for operation. Indeed, the utterance of the user speech 128 may be accidental or unintentional and may lack a defined grammar or syntax. However, based on the user context data 126 which includes information about the pick list of items associated with the user 116, as well as the item data 332, the physical layout data 330, the user position data 336, and so forth, the speech interaction module 320 is able to provide useful information to the user 116 to facilitate performance of the user's 116 tasks.

Figure 9:
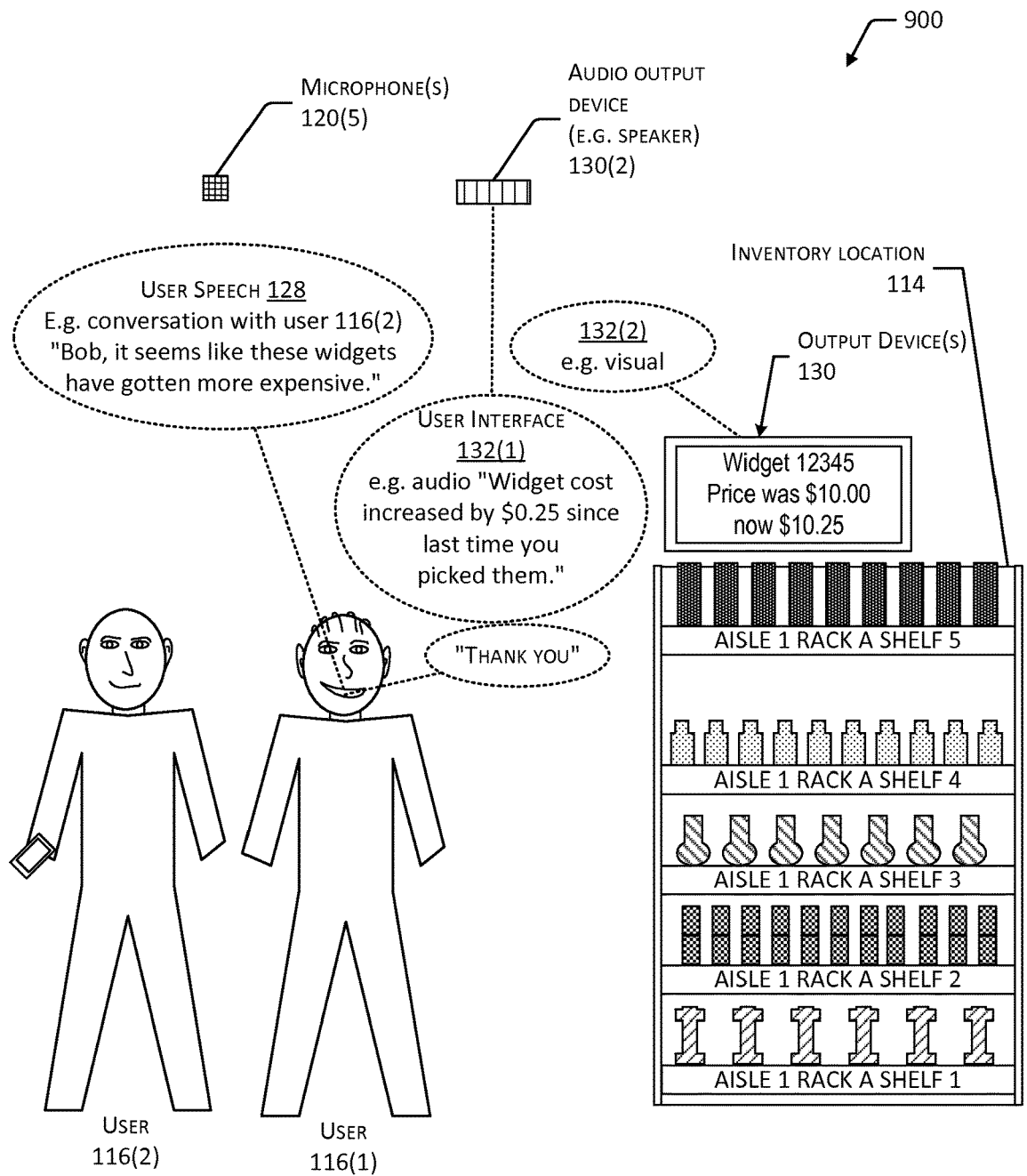
FIG. 9 illustrates the system responding to speech between two users of the facility, according to some implementations.

FIG. 9 illustrates a scenario 900 in which the system 100 responds to user speech 128 between two users 116(1) and 116(2) of the facility 102, according to some implementations. As described above, the facility 102 may include one or more sensors 120 such as microphones 120(5) and one or more output devices 130 such as audio output devices 130(2). In this illustration, two users 116(1) and 116(2) are shown in a portion of the facility 102 which includes an inventory location 114 holding various items 104. While working together, the first user 116(1) says aloud to the second user 116(2) "Bob, it seems like these widgets have gotten more expensive." In terms of wording and inflection, this user speech 128 is declarative. However, the speech interaction module 320, based on the user context data 126, retrieves information about cost changes associated with the item 104 which is named "widget" and determines that an appropriate action is to present this information. The speech interaction module 320 may then provide this information to the user interface module 322 which generates user interface data 354 suitable for providing one or more of an audible user interface 132(1) or a visual user interface 132(2). The user 116(1) may provide an affirmation that the user interface 132 providing information was of use by issuing further user speech 128 such as "thank you".

In another implementation not illustrated here, the user 116(1) may be carrying on the conversation with a person or system not present at that position within the facility 102 or not in the facility 102 at all. For example, the user 116(1) may be conversing with the user 116(2) via a two-way radio, cell phone, or other audio communication device. In another example, the user 116(1) may be providing verbal input to another system, such as providing instructions or a query to an intelligent personal assistant application executing at least in part on the user device 134.

Illustrative Processes

Figure 10:
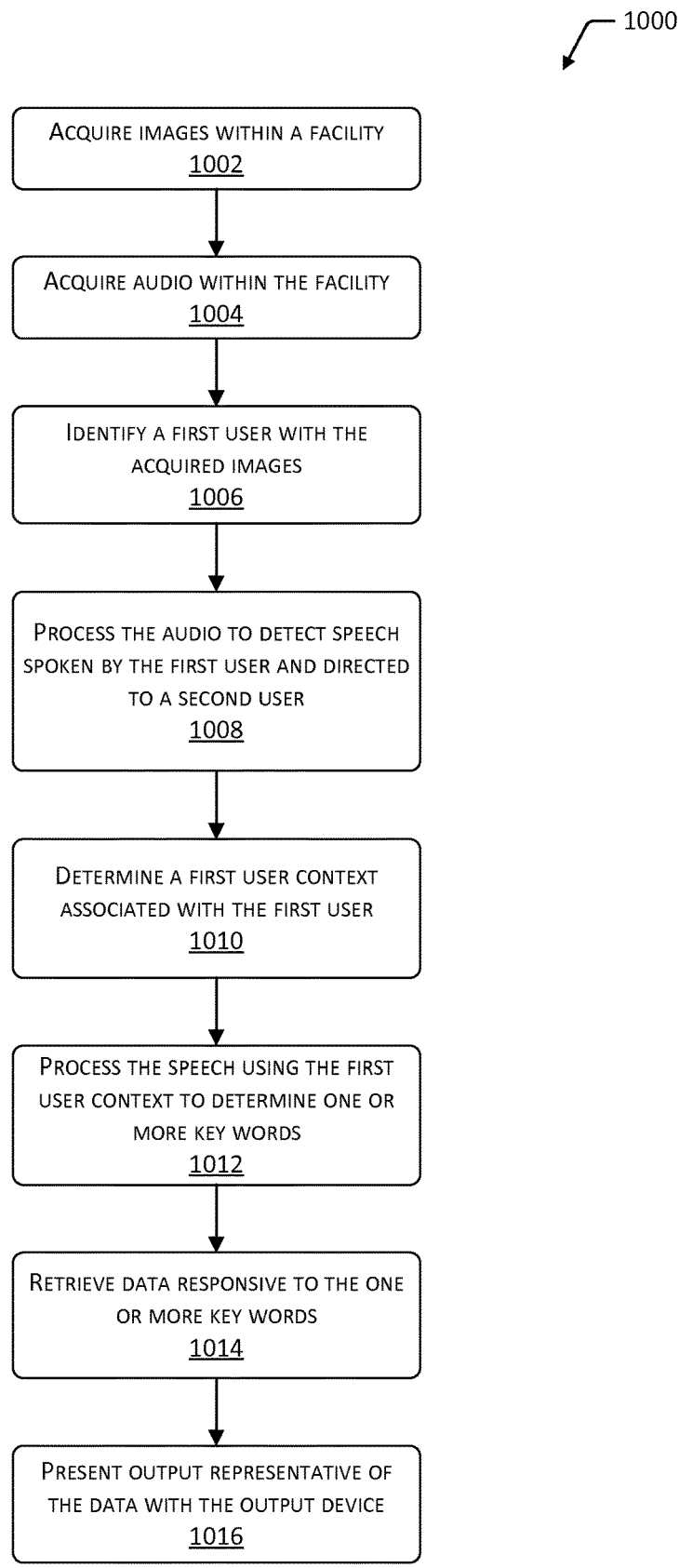
FIG. 10 depicts a flow diagram of a process for performing actions based on speech between users of the facility, according to some implementations.

FIG. 10 depicts a flow diagram 1000 of a process for performing actions based on speech between users 116 of the facility 102, according to some implementations. In some implementations, the process may be performed at least in part by the inventory management module 316.

Block 1002 acquires images within the facility 102. For example, the imaging sensors 120(1) may generate image data 328(1).

Block 1004 acquires audio within the facility 102. For example, the microphones 120(5) may generate the audio data 328(2).

Block 1006 identifies a first user 116(1) with the acquired images. For example, the image data 328(1) may be processed using one or more techniques to determine identity of the first user 116(1). These techniques may include one or more of facial recognition, clothing recognition, gait recognition, and so forth. In other implementations, other techniques may be used instead of or in addition to identification by way of the image data 328(1). For example, a user 116 may be identified by way of an RFID tag, manual entry of credentials at an input device, and so forth.

Facial recognition may include analyzing facial characteristics which are indicative of one or more facial features in an image, three-dimensional data, or both. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations the facial characteristics may include facial metrics. The facial metrics indicate various ratios of relative sizes and spacing of the facial features. For example, the facial metrics may include ratio of interpupillary distance to facial width, ratio of eye width to nose width, and so forth. In some implementations the facial characteristics may comprise a set of eigenvectors by using principal component analysis (PCA) on a set of images. These eigenvectors as descriptive of a human face may be known as "eigenfaces" or "eigenimages". In one implementation the facial recognition described in this disclosure may be performed at least in part using one or more tools available in the OpenCV library as developed by Intel Corporation of Santa Clara, Calif., Willow Garage of Menlo Park, Calif., and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity. The facial characteristics may be used to identify the user 116, or to distinguish one user 116 from another.

Clothing recognition analyzes images to determine what articles of clothing, ornamentation, and so forth the user 116 is wearing or carrying. Skin and hair detection algorithms may be used to classify portions of the image which are associated with the user's 116 skin or hair. Items which are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. For example, the user 116(2) may be distinguished from the user 116(3) based at least in part on the user 116(2) wearing a hat and a red shirt while the user 116(3) is not wearing a hat and is wearing a blue shirt. The clothing may be used to identify the user 116, or distinguish one user 116 from another.

Gait recognition analyzes images, three-dimensional data, or both to assess how a user 116 moves over time. Gait comprises a recognizable pattern of movement of the user's 116 body which is affected by height, age, and other factors. Gait recognition may analyze the relative position and motion of limbs of the user 116. Limbs may include one or more arms, legs, and in some implementations, head. In one implementation edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116, or distinguish one user 116 from another.

In some implementations, identity may be based on a combination of these or other recognition techniques. For example, the user 116 may be identified based on clothing recognition, gait recognition, and facial recognition. The different recognition techniques may be used in different situations, or in succession. For example, clothing recognition and gait recognition may be used at greater distances between the user 116 and the imaging sensors 120(1) or when the user's 116 face is obscured from view of the imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102.

In other implementations other techniques for facial recognition, clothing recognition, gait recognition, and so forth may be employed. For example, facial recognition may use iris detection and recognition, clothing recognition may use embedded RF tags, gait recognition may utilize data from weight sensors 120(6), and so forth.

Block 1008 processes the audio to detect user speech 128 spoken by the first user 116(1) and directed to a second user 116(2) of the facility 102. For example, the audio data 328(2) may be processed to isolate the sound of the first user's 116(1) voice and to remove background noises such as that of machinery in the facility 102.

In some implementations, various techniques may be used to determine which user 116 is speaking within the facility 102. For example, should the facility 102 be busy, multiple users 116 may be speaking simultaneously. These techniques may include TDOA, beamforming, use of data from imaging sensors 120(1), weight sensors 120(6), and so forth. By determining which user 116 is speaking, a speech interaction module 320 may be able to access the user context data 126 associated with that user 116.

The determination as to whether the first user 116(1) is speaking or not may be based at least in part on one or more of: facial motions of the first user 116 in the acquired images, voice recognition, or sound source localization using the audio from the plurality of microphones 120(5). For example, timestamps of the sensor data 328 may be compared to determine if the image data 328(1) for an image frame in which the user's 116 mouth is open corresponds to a point in time at which audio data 328(2) has been acquired from a microphone 120(5) which is proximate to the position of the user 116 as specified in the position data 336. By detecting the motion of the user's face 116, and the presence of corresponding audio, it may be determined that the user 116 is emitting a sound. In another example, voice recognition may be used to distinguish the speech of one user 116 from another. For example, the voice recognition may use pitch, pace, cadence, and so forth to distinguish one user 116 from another. In yet another example, using one or more beamforming techniques, or by sampling data from a plurality of microphones 120(5) some of which are close to the user 116, some of which are far away, the system may determine that a particular user 116 is speaking.

Block 1010 determines a first user context associated with the first user 116(1). For example, the user context data 126(1) for the identified user 116(1) may be retrieved from the data store 326. The first user context data 126 may be indicative of one or more of: the historical activity data 334 of the first user 116(1), the gaze direction data 340 of the first user 116(1), position data 336 of the first user 116(1) within the facility 102, proximity data 338 of the first user 116(1) to the second user 116(2), demographic data 344 of the first user 116(1), user preferences 348 of the first user 116(1), or other information.

In some implementations, the user context data 126 may include information indicative of the identity of other users 116, such as those who are proximate to the first user 116(1). By knowing to whom the first user 116(1) is speaking, the speech interaction module 320 may be better able to process the user speech 128 as described next.

Furthermore, in some implementations a second user context data 126(2) associated with a second user 116(2) may be determined. The second user 116(2) may be identified as described as above. For example, the second user context data 126(2) for the second user 116(2) may be retrieved from the data store 326. The second user context data 126(2) may include the identity of the first user 116(1). Stated another way, each of the users 116(1) and 116(2) may have their own respective user context data 126 which is indicative of the identity of the other user 116.

Block 1012 processes, using the first user context 126(1), the user speech 128 to determine one or more key words or phrases. The key words or phrases may be designated by a system administrator, designated by the user 116, automatically determined, or a combination thereof. For example, the key words may be the name of an item 104 as stored in the facility 102, particular adjectives such as "expensive", particular nouns such as "tote", and so forth. Continuing the example, as described above with regard to FIG. 9, the keywords may be "widget", "cost", "expensive" and "last time".

In other implementations where the second user context 126(2) is available, the processing of the user speech 128 may be further based at least in part on the second user context 126(2). For example, by knowing the participants in the conversation, the speech interaction module 320 may be better able to determine actions.

Block 1014 retrieves data responsive to the one or more key words. For example, the speech interaction module 320 may generate a query for cost changes associated with the item 104 named "widget".

Block 1016 presents output representative of the data with the output device 130. Continuing the example, the output device 130 may comprise an audio output device 130(2). The output may comprise an audible user interface 132 in which the inventory management module 316 generates user interface data 354 configured to present the audible user interface 132(1), the visual user interface 132(2), or both responsive to the user speech 128.

As described above, in some implementations the system 100 may be responsive to feedback provided by the user 116. For example, after receiving the information about the widget, the user 116(1) may find the information of use and respond by saying "thank you". The second user speech 128(2) as uttered by the first user 116(1) may be deemed indicative of acceptance of the data provided to the first user 116(1). Information indicative of the acceptance may then be stored as historical activity data 334 of the first user 116(1). This information may then be used to modify operation of the speech interaction module 320, such as by changing weights of one or more elements within a neural network.

In some implementations, the tote 118 may include one or more output devices 130. For example, the tote 118 may include a display output device 130(3). This output device 130 onboard or coupled to the tote 118 may be used to present a visual user interface 132(2).

Figure 11:
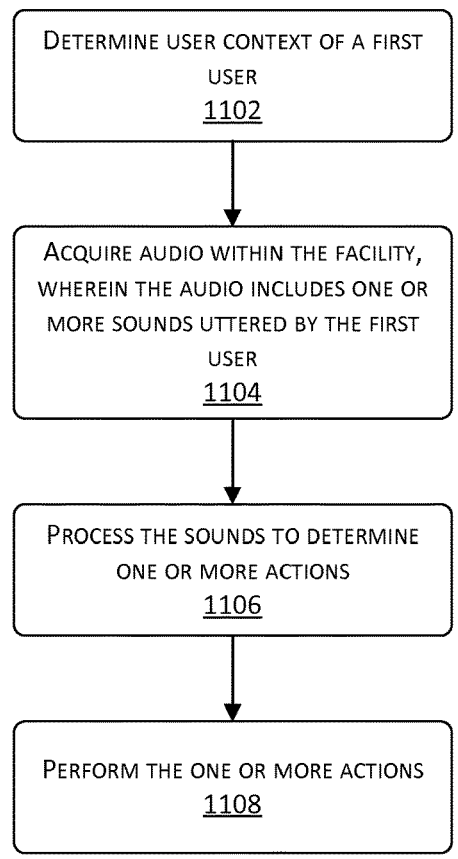
FIG. 11 depicts a flow diagram of another process for performing actions based on speech between users of the facility, according to some implementations.

FIG. 11 depicts a flow diagram 1100 of another process for performing actions based on user speech 128 between users 116 of the facility 102, according to some implementations.

Block 1102 determines a user context associated with a first user 116(1) of the facility 102. As described above, the user context data 126 may comprise data indicative of one or more of: the historical activity data 334 of the first user 116(1), position data 336 of the first user 116(1) within the facility 102, proximity data 338 of the first user 116(1), gaze direction data 340 of the first user 116(1) to other users such as a second user 116(2), and so forth.

In some implementations, the user context data 126 may include relationship data 346. The relationship data 346 may be indicative of a relationship between the first user 116(1) and the second user 116(2). The relationship data 346 may be determined based on one or more of: the first user 116(1) and the second user 116(2) entering the facility 102 together, the first user 116(1) and the second user 116(2) moving together within the facility 102, or previously stored information indicative of a relationship. For example, facility entry data may comprise log data or other information which indicates the first user 116(1) and the second user 116(2) entered the facility 102 contemporaneously and within a threshold distance of one another. In another example, the user context data 126 may indicate that the first user 116(1) and the second user 116(2) have a relationship because they have been walking proximate to one another for a predetermined length of time within the facility 102.

The user context data 126 may be received, at least in part, from the user device 134. For example, the data acquisition module 318 may receive from the user device 134 one or more of information exchanged using a short message service (SMS), information exchanged using an instant messaging service, call metadata associated with an incoming or outgoing telephone or video call, application state data indicative of an application executing on the user device 134, or other information. For example, the user context data 126 may include text from an instant message "Get more widgets", while the user speech 128 may be the first user 116(1) muttering "well, where are they?" By using the text of the instant message, the speech interaction module 320 is able to process the user speech 128 and determine that the first user 116(1) would benefit from information indicative of the inventory locations 114 of the widgets.

In another example, the call metadata may comprise information such as a telephone number or other network address of the other party(s) with whom communication has been attempted or is established. Other call metadata may include a duration of the call, indication of who originated the call, and so forth.

In yet another example, the application state data may include information such as a browser history, look up history, and so forth. Continuing this example, the first user 116(1) may be looking up technical details about widgets. Based on this information and the user speech 128, the speech interaction module 320 may provide the information as to the whereabouts of the widgets.

The user context data 126 may include information indicative of a wordbase in use by the user 116. The wordbase may comprise words, idioms, and phrasing information associated with how the user 116 uses language. Users 116 from different regions or backgrounds may use different wordbases. The speech interaction module 320 may be configured to determine a wordbase of the user 116 based on one or more of word selection of the user 116, language of the user speech 128, cadence of the user speech 128, manual information designating a wordbase of the user 116, and so forth. For example, the speech interaction module 320 may use demographic data 344 about the user 116(1) to determine that the user 116(1) is from the United Kingdom. As a result, the user speech 128 may be processed using a United Kingdom wordbase, enabling the speech interaction module 320 to correctly determine that the user 116(1) is referring to a flashlight and not a combustible object in the phrase "where is the torch?"

As described above, in some implementations the process may include determining an identity of the first user 116(1). Once identified, user data 342 associated with the identity may be accessed. For example, facial recognition, speech recognition, receipt of an RFID tag, and so forth may be used to associate the first user 116(1) with a particular user account and the corresponding user data 342 associated therewith.

Block 1104 acquires audio of the user speech 128 or other sounds uttered or otherwise generated by the first user 116(1). For example, the microphones 120(5) may generate audio data 328(2). As described above, the user speech 128 may be directed to a second user 116(2). The second user 116(2) may be an identified user of the facility 102, a guest of the first user 116(1), or a person whom the first user 116(1) is speaking to by way of a two-way radio, telephone, and so forth.

Block 1106 uses the first user context data 126(1) to process the user speech 128. The processing may include speech recognition, semantic analysis, and so forth. The processing results in a determination of one or more actions which the system 100 may perform to facilitate the user 116.

The actions may include one or more of doing nothing, storing information, retrieving information, presenting information, dispatching assistance from another user 116, moving inventory 104, moving inventory locations 114, and so forth.

Block 1108 performs the one or more actions. For example, the one or more actions may include moving one or more inventory locations 114 from a first position in the facility 102 to a second position in the facility 102. As described above, the inventory locations 114 may be able to be repositioned within the facility 102, such as moving from one aisle 112 to another. In another example, the one or more actions may include moving one or more items 104 from a first inventory location 114 to a second inventory location 114, or from a first position of the facility 102 to a second position. For example, a conveyor, robot, crane, and so forth may be used to move the widget from a high storage rack to a lower level which is accessible to the first user 116(1).

Other actions may include modifying how the first user 116(1) is directed through the facility 102. A block or module may be configured to access a first proposed route for the first user 116(1) through the facility 102. For example, the navigation path data 350 data for the first user 116(1) may be retrieved. Another block may then modify the first proposed route to generate a second proposed route. The modification may include adding or removing waypoints, changing a waypoint sequence, and so forth. For example, the modified path may include an addition of a waypoint for the inventory location 114 associated with the item 104 "widget" which the first user 116(1) had mentioned in his user speech 128.

The actions may further include providing navigational guidance in the facility 102 to the first user 116(1) based on the second proposed route. The navigational guidance may comprise prompts provided by way of an output device which serves to direct the user 116(1) to a particular location in the facility 102. Continuing the example, the first user 116(1) may be provided with audible prompts stating which direction to turn or visual prompts such as arrows or lines indicating a direction of travel corresponding to the second proposed route. In other implementations navigational guidance may comprise visual projections being projected within the facility 102, illumination of particular lights within the facility 102, and so forth.

As described above, the actions may include presenting information by way of the user interface 132. In some implementations, the user interface 132 and how the user interface 132 is presented may be specific to the user 116. For example, the user data 342 may include user preferences 348 which specify particular situations within which the visual user interfaces 132(2) are to be used and other situations within which audible user interfaces 132(1) are to be used. Based at least in part on the user data 342, user interface data 354 may be generated. Also based at least in part on the user data 342, a particular output device 130 may be selected. Continuing the example above, the first user 116(1) may specify a user preference 348 that when another person is within 2 m of the first user 116(1), the visual interface is to be used and presented on the display output device 130(3) of the user device 134 associated with the first user 116(1). Given that another person is present within the 2 m threshold distance, the user interface data 354 may be configured to provide a visual user interface 132(2). The user interface data 354 may be provided to the user device 134 which has been selected for presentation.

In some situations, the determined action may be modified based on the presence of a third person. For example, the first user 116(1) and the second user 116(2) may be conversing with one another when a third user 116(3) approaches. The block may determine a third person, such as the user 116(3), is within a threshold distance of the first user 116(1). For example, the threshold distance may be 3 m and the third user 116(3) may be 2.5 m away from the first user 116(1), and thus within the threshold distance. User interface data 354 may be generated and may be sent to the output device 130 which is associated with the first user 116(1). The output device 130 may be associated in some implementations by being within the presence of or in the possession of the first user 116(1). For example, the user interface data 354 may be sent to the user device 134 which is being carried by the first user 116(1). In another example, the user interface data 354 may be sent to the tote 118 which is being used by the first user 116(1).

The user speech 128 may comprise an inquiry or may result in an inquiry. The one or more actions may include presentation of information responsive to the inquiry. The information presented in a user interface 132 may be strongly suggestive of the nature of the inquiry, or provide other information about the user context. It may be advantageous to safeguard information about the user context data 126 by obfuscating information presented in the user interface 132. This obfuscation may include presenting information in the user interface 132 which is responsive to the original inquiry, as well as other information which has been previously inquired about the other users 116. Thus, the user interface 132 provides the information requested by the user 116, as well as information which is not a request by the user 116. To another party observing the user interface 132, it may not be apparent what information is specifically associated with the user 116 which made the initial inquiry.

One or more blocks execute a first query to retrieve first information associated with the first inquiry. The first query may be responsive to user speech 128 uttered by the first user 116(1). A second query is executed to retrieve second information from a previous inquiry made by a different user 116, such as from user 116(5). In some implementations the second query may be selected from actions corresponding to user speech 128 previously uttered in other similar circumstances, while in the same area of the facility 102, and so forth. The user interface data 354 is generated using the first information and the second information.

An output device 130 accessible to the first user 116(1) and other users of the facility 102 is selected. For example, the output device 130 may comprise an overhead speaker or a publicly visible display device 130(3). The user interface data 354 is processed to provide a user interface 132 by way of the selected output device 130. For example, the user interface 132 may provide the information responsive to the user speech 128 as well as the other information.

Some information which may be presented by the user interface 132 may be deemed sensitive, such that public presentation is discouraged or impermissible. The actions performed by the inventory management module 316 may include one or more of presenting information designated as personally identifiable information, presenting information designated as sensitive, or presenting information about another user 116, and so forth. For example, the personally identifiable information may include a residential address of the user 116, information about a customer of the facility 102, and so forth.

In such a situation, an output device 130 associated with the first user 116(1) may be selected. The association may be determined based at least in part on proximity, user preferences 348, and so forth. For example, the user preference 348 may specify that sensitive information is to be presented by way of the user device 134 of the first user 116(1), instead of a display device 130(3) which is visible to many users 116. Once selected, the output device 130 may be used to present the user interface 132. Continuing the example, the personally identifiable information may be presented on the display device 130(3) of the user device 134.

The inventory management module 316 may be configured to provide information prospectively which has been previously provided responsive to user speech 128 on other occasions. For example, as the user 116 walks into a particular area of the facility 102 they may be presented with information corresponding to a top three set of inquiries made in that area.

The process for this prospective presentation may include the following. Response data resulting from queries previously generated responsive to speech uttered within a designated area of the facility 102 may be retrieved. For example, response data comprising results of queries responsive to the user speech 128 which has emanated from the users 116 within aisle 112(1) is retrieved from the data store 326.

The inventory management module 316 may determine the first user 116(1) is present in the designated area. Continuing the example, the position data 336 for the first user 116(1) indicates the first user 116(1) is within the aisle 112(1).

The response data may be presented by way of the user interface 132. For example, the response data may be used to generate user interface data 354 which is provided to the output devices 130 in the aisle 112(1). The first user 116(1) has now been presented with the information. The user speech 128 uttered by the first user 116(1) after this presentation may seek additional information, resulting in an additional query. This additional query may be executed to retrieve further information. For example, the user speech 128 may indicate that the first user 116(1) would like to have more detail. This information may be retrieved and presented with the corresponding modification of the user interface 132 based at least in part on the information.

The block 1108 may also be configured to perform actions which include requesting permission from the first user 116(1) to take other actions. In this fashion, the speech interaction module 320 may seek confirmation prior to taking other actions. The first user 116(1) may be presented with the user interface 132 which prompts the first user 116(1) for permission to perform an action. For example, the user interface 132 may comprise synthesized speech asking the first user 116(1) "would you like more information on widgets?" Subsequent performance of the action may be responsive to receiving second user speech 128(2) which is indicative of assent to perform the action. Continuing the example, the first user 116(1) may respond with the user speech 128(2) "yes". Following this, the first user 116(1) may be presented with the user interface 132 which includes the additional information on widgets. As described above, in other implementations the user interfaces 132 may be visual, haptic, audible, and so forth.

The actions performed by the inventory management module 316 may also include dispatching a second user 116(2), a tote 118, robots, or other resource to the first user 116(1). For example, the audio acquired from the first user 116(1) may be processed to determine the presence of non-lexical utterances and item data 332 indicating that a particularly heavy item 104 is being picked, and that the first user 116(1) is having difficulty loading the item 104 onto a tote 118. The corresponding action taken by the speech interaction module 320 may be to dispatch a second user 116(2) to help with loading.

By using the techniques and systems described in this disclosure, users 116 of the facility 102 may be able to perform their tasks more efficiently and effectively. Instead of having to stop and express a particular inquiry or otherwise directly interact with the inventory management system 122, the users 116 are able to go about their business within the facility 102 receiving assistance in the form of the various actions which may be undertaken automatically, or after assent by the user 116.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

The invention claimed is:

1. A system for presenting information in a materials handling facility (facility), the system comprising:
 a plurality of microphones configured to continuously acquire audio data representative of sound within the facility;
 a plurality of imaging sensors configured to acquire images within the facility;
 an output device;
 a memory, storing computer-executable instructions; and
 a hardware processor in communication with the plurality of microphones, the plurality of imaging sensors, the output device, and the memory, wherein the hardware processor is configured to execute the computer-executable instructions to:
  identify a first user and a second user using the images acquired within the facility;
  determine a relationship between the first user and the second user, wherein the relationship is determined based on the first user and the second user entering the facility at substantially the same time and within a first threshold distance of one another;
  process the audio data to detect a portion of the audio data comprising user speech, the user speech comprising natural language spoken by the first user to the second user, wherein the first user and the second user are within a second threshold distance of each other based on the images acquired within the facility;
  determine a first user context associated with the first user, wherein the first user context is indicative of one or more of:
   the relationship between the first user and the second user,
   historical activity of the first user,
   a gaze direction of the first user,
   position of the first user within the facility,
   proximity of the first user to the second user,
   demographics of the first user, or
   preferences of the first user;
  process, using the first user context, the portion of the audio data comprising user speech that is spoken by the first user to the second user to determine one or more key words;
  retrieve data responsive to the one or more key words; and
  present output representative of the data with the output device.

2. The system of claim 1, wherein the output device comprises a speaker and the output representative of the data comprises speech sounds, and further comprising computer-executable instructions to:
 process the audio data to detect second user speech spoken by the first user, wherein the second user speech is indicative of acceptance of the data by the first user; and
 store information indicative of the acceptance of the data with the historical activity of the first user; and
 wherein the processing of the portion of the audio data to determine the one or more key words comprises computer-executable instructions to:

configure operation of a Hidden Markov Model using the first user context.

3. The system of claim 1, further comprising a tote and wherein:
 the output device comprises a display device coupled to the tote;
 the output comprises a user interface presented on the display device; and further comprising computer-executable instructions to:
  determine the first user is speaking to the second user based on one or more of:
   facial motions of the first user in the acquired images,
   voice recognition, or
   sound source localization using the audio data from the plurality of microphones; and
 wherein the determination of the first user context is based on the determination the first user is speaking.

4. The system of claim 1, wherein:
 the identification of the first user and the second user is based at least in part on one or more of:
  facial recognition comprising:
   detection of a face in the acquired images,
   calculation of one or more eigenvectors of the face, and
   comparison of the one or more eigenvectors with previously stored data;
  clothing recognition comprising:
   detection of one or more articles of clothing in the acquired images,
   classification of the one or more articles of clothing, and
   comparison of the classifications of the one or more articles of clothing with previously stored data; or
  gait recognition comprising:
   determination of one or more user limbs in the acquired images,
   determination of a change in position over time of the one or more user limbs, and
   comparison of the change in position over time with previously stored data; and
 wherein the first user context includes identity of the second user;
 determine a second user context associated with the second user, wherein the second user context includes the identity of the first user; and
 wherein the processing of the portion of the audio data comprising the user speech is further based on the second user context.

5. A computer implemented method comprising:
 accessing sensor data obtained from one or more sensors within a material handling facility (facility);
 determining a relationship between a first user and a second user, wherein the relationship is based on facility entry data indicative of the first user and the second user entering the facility at substantially the same time and within a first threshold distance of one another;
 determining, using the sensor data, a user context associated with a first user of the facility, wherein the user context comprises data indicative of the relationship between the first user and the second user;
 acquiring, using one or more microphones in the facility, audio data of user speech generated by the first user while speaking to the second user of the facility in natural language, wherein the first user and the second user are within a second threshold distance of each other based on the sensor data;

using the user context, processing the audio data of the user speech with a computing device to determine one or more actions; and operating, via a network, one or more devices at the facility to perform the one or more actions.

6. The computer implemented method of claim 5, wherein the user context comprises data indicative of one or more items within the facility that the first user is interacting with.

7. The computer implemented method of claim 5, wherein the user context comprises data received from a user device, the data comprising one or more of:
   information exchanged using a short message service (SMS),
   information exchanged using an instant messaging service,
   call metadata associated with an incoming or outgoing telephone or video call, or
   application state data indicative of an application executing on the user device.

8. The computer implemented method of claim 5, further comprising:
   determining a wordbase of the first user based on one or more of:
      word selection in the user speech,
      language of the user speech, or
      cadence of the user speech; and
   wherein the user context further comprises the determined wordbase.

9. The computer implemented method of claim 5, further comprising:
   determining an identity of the first user;
   accessing user data associated with the identity; and
   wherein the user context further comprises the user data.

10. The computer implemented method of claim 9, further comprising:
   based at least in part on the user data, generating user interface data;
   based at least in part on the user data, selecting an output device; and
   wherein the one or more actions comprise:
      presenting a user interface by way of the selected output device using the user interface data.

11. The computer implemented method of claim 5, wherein the one or more actions comprise one or more of:
   moving an inventory location from a first position in the facility to a second position in the facility, or
   moving one or more items from a first inventory location to a second inventory location.

12. The computer implemented method of claim 5, further comprising:
   accessing a first proposed route for the first user through the facility;
   modifying the first proposed route to generate a second proposed route; and
   wherein the one or more actions comprise providing navigational guidance in the facility to the first user based on the second proposed route.

13. The computer implemented method of claim 5, further comprising:
   determining a third user is within a third threshold distance of the first user;
   generating user interface data; and
   sending the user interface data to an output device associated with the first user, wherein the output device is part of a user device or a tote.

14. The computer implemented method of claim 5, wherein the natural language does not comprise an inquiry; and
   further wherein the one or more actions comprise:
      generating a first inquiry from the natural language;
      executing a first query to retrieve first information associated with the first inquiry;
      executing a second query to retrieve second information from a previous inquiry made by a different user;
      generating user interface data using the first information and the second information;
      selecting an output device accessible to the first user and other users of the facility; and
      processing the user interface data to provide a user interface by way of the selected output device.

15. The computer implemented method of claim 5, wherein the one or more actions comprising:
   one or more of:
      presenting information designated as personally identifiable information,
      presenting information designated as sensitive, or
      presenting information about another user;
   selecting an output device associated with the first user; and
   presenting a user interface by way of the selected output device.

16. The computer implemented method of claim 5, further comprising:
   retrieving response data resulting from queries previously generated responsive to speech uttered within a designated area of the facility;
   determining the first user is present in the designated area;
   presenting by way of a user interface the response data; and
   wherein the natural language is processed to generate an inquiry associated with the response data; and
   further wherein the one or more actions comprise:
      executing a query to retrieve information associated with the inquiry; and
      modifying the user interface based on the information.

17. The computer implemented method of claim 5, wherein the one or more actions comprise:
   prompting the first user for permission to perform an action; and
   wherein the performing the action is responsive to receiving second user speech indicative of assent to perform the action.

18. A computer implemented method comprising:
   acquiring, using one or more microphones connected to a network at a material handling facility (facility), audio data representative of sound at the facility;
   acquiring, using one or more sensors at the facility that are connected to the network, sensor data;
   determining, with one or more computing devices, a relationship between a first user and a second user, wherein the relationship is determined based on the first user and the second user entering the facility at substantially the same time and within a threshold distance of one another;
   processing the sensor data using the one or more computing devices to determine a user context of the first user at the facility, wherein the user context is indicative of the relationship between the first user and the second user;
   recognizing, with the one or more computing devices, a sound uttered by the first user and directed to the second user at the facility in the acquired audio data;

determining, with the one or more computing devices, an action based on the user context and the sound that is recognized; and sending from the one or more computing devices, via a network, commands to perform one or more actions associated with operation of the facility.

19. The computer implemented method of claim 18, wherein the sound is a non-lexical utterance.

20. The computer implemented method of claim 18, wherein the one or more actions comprise dispatching a third user to assist the first user.

21. The computer implemented method of claim 18, wherein the one or more actions comprise:

retrieving information;

presenting a first user interface comprising a request for permission to present the retrieved information;

receiving input from the user interface indicative of approval to present the retrieved information; and presenting a second user interface comprising at least a portion of the information.

\* \* \* \* \*

UNITED STATES PATENT AND TRADEMARK OFFICE
CERTIFICATE OF CORRECTION

PATENT NO. : 12,417,430 B1  
APPLICATION NO. : 14/307053  
DATED : September 16, 2025  
INVENTOR(S) : Ohil Krishnamurthy Manyam et al.

Page 1 of 5

It is certified that error appears in the above-identified patent and that said Letters Patent is hereby corrected as shown below:

In the Claims

Column 39, Claim 2, Lines 57-58:  
Currently read "and further comprising computer-executable instructions to:"  
Where they should read --wherein the hardware processor is further configured to execute the computer-executable instructions to:--

Column 39, Claim 2, Lines 65-67:  
Currently read "wherein the processing of the portion of the audio data to determine the one or more key words comprises computer-executable instructions to:"  
Where they should read --wherein the computer-executable instructions to process the portion of the audio data comprising the user speech that is spoken by the first user to the second user to determine the one or more key words further comprise computer-executable instructions to:--

Column 40, Claim 3, Lines 3-4:  
Currently read "The system of claim 1, further comprising a tote and wherein:"  
Where they should read --The system of claim 1, further comprising a tote, wherein:--

Column 40, Claim 3, Line 6:  
Currently reads "the tote;"  
Where it should read --the tote, and--

Column 40, Claim 3, Lines 8-9:  
Currently read "and further comprising computer-executable instructions to:"  
Where they should read --wherein the hardware processor is further configured to execute the computer-executable instructions to:--

Column 40, Claim 3, Line 10:

Signed and Sealed this  
Fourth Day of November, 2025

John A. Squires  
*Director of the United States Patent and Trademark Office*

Currently reads "determine the first user is speaking to the second user"
Where it should read --determine that the first user is speaking to the second user--

Column 40, Claim 3, Lines 12-13:
Currently read "facial motions of the first user in the acquired images,"
Where they should read --facial motions of the first user in the images,--

Column 40, Claim 3, Line 18:
Currently reads "on the determination the first user is speaking."
Where it should read --on the determination that the first user is speaking to the second user.--

Column 40, Claim 4, Line 23:
Currently reads "detection of a face in the acquired images,"
Where it should read --detection of a face in the images,--

Column 40, Claim 4, Lines 29-30:
Currently read "detection of one or more articles of clothing in the acquired images,"
Where they should read --detection of one or more articles of clothing in the images,--

Column 40, Claim 4, Line 34:
Currently reads "articles of clothing with previously stored data; or,"
Where it should read --articles of clothing with the previously stored data; or--

Column 40, Claim 4, Lines 36-37:
Currently read "determination of one or more user limbs in the acquired images,"
Where they should read --determination of one or more user limbs in the images,--

Column 40, Claim 4, Lines 40-41:
Currently read "comparison of the change in position over time with previously stored data; and"
Where they should read --comparison of the change in position over time with the previously stored data;--

Column 40, Claim 4, BETWEEN Lines 43 and 44:
Entire line is missing.
Missing line should read --wherein the hardware processor is further configured to execute the computer-executable instructions to:"--

Column 40, Claim 4, Line 44:
Currently reads "determine a second user context associated with the"
Where it should read --determine second user context associated with the--

Column 40, Claim 4, Lines 47-49:
Currently read "wherein the processing of the portion of the audio data comprising the user speech is further based on the second user context."
Where they should read --wherein the computer-executable instructions to process the portion of the audio data comprising the user speech that is spoken by the first user to the second user to determine the one or more key words further use the second user context.--

Column 40, Claim 5, Line 56:
Currently reads "user entering the facility at substantially the same time"
Where it should read --user entering the facility at substantially a same time--

Column 40, Claim 5, Line 58:
Currently reads "determining, using the sensor data, a user context"
Where it should read --determining, using the sensor data, user context--

Column 40, Claim 5, Line 59:
Currently reads "with a first user of the facility,"
Where it should read --with the first user of the facility,--

Column 41, Claim 7, Line 11:
Currently reads "the data comprising one or more of:"
Where it should read --the data received from the user device comprising one or more of:--

Column 41, Claim 8, Line 27:
Currently reads "cadence of the user speech; and"
Where it should read --cadence of the user speech;--

Column 41, Claim 8, Lines 28-29:
Currently read "wherein the user context further comprises the determined wordbase."
Where they should read --wherein the user context further comprises the wordbase.--

Column 41, Claim 9, Lines 32-33:
Currently read "determining an identity of the first user;
accessing user data associated with the identity; and"
Where they should read --determining an identity of the first user; and
accessing user data associated with the identity;--

Column 41, Claim 10, Lines 38-41:
Currently read "based at least in part on the user data, generating user interface data;
based at least in part on the user data, selecting an output device; and"
Where they should read --based at least in part on the user data, generating user interface data; and
based at least in part on the user data, selecting an output device;--

Column 41, Claim 10, Lines 43-44:
Currently read "presenting a user interface by way of the selected output device using the user interface data."
Where they should read --presenting a user interface by way of the output device using the user interface data.--

Column 42, Claim 14, Line 15:
Currently reads "interface by way of the selected output device."
Where it should read --interface by way of the output device.--

Column 42, Claim 15, Lines 17-18:
Currently read "wherein the one or more actions comprising: one or more of:"
Where they should read --wherein the one or more actions comprise one or more of:--

Column 42, Claim 15, Line 25:
Currently reads "presenting a user interface by way of the selected output"
Where it should read --presenting a user interface by way of the output--

Column 42, Claim 16, Lines 32-34:
Currently read "determining the first user is present in the designated area; presenting by way of a user interface the response data; and"
Where they should read --determining the first user is present in the designated area; and presenting by way of a user interface the response data;--

Column 42, Claim 17, Line 45:
Currently reads "wherein the performing the action is responsive to"
Where it should read --performing the action responsive to--

Column 42, Claim 18, Line 58:
Currently reads "the same time and within a threshold distance"
Where it should read --a same time and within a threshold distance--

Column 42, Claim 18, Line 61:
Currently reads "devices to determine a user context of the first"
Where it should read --devices to determine user context of the first--

Column 42, Claim 18, Line 67:
Currently reads "second user at the facility in the acquired audio data;"
Where it should read --second user at the facility in the audio data;--

Column 43, Claim 18, Line 4:
Currently reads "sending from the one or more computing devices, via a"
Where it should read --sending from the one or more computing devices, via the--

CERTIFICATE OF CORRECTION (continued)
U.S. Pat. No. 12,417,430 B1

Column 43, Claim 21, Line 16:
Currently reads "permission to present the retrieved information;"
Where it should read --permission to present the information;--

Column 43, Claim 21, Line 18:
Currently reads "approval to present the retrieved information; and"
Where it should read --approval to present the information; and--